(12) United States Patent
Shah et al.

(10) Patent No.: US 12,505,961 B2
(45) Date of Patent: Dec. 23, 2025

(54) LIGHT-RESPONSIVE SUPERCAPACITOR BASED ON DATE LEAVES DERIVED CARBON AND $BIVO_4$ PHOTOCAPACITIVE ELECTRODES

(71) Applicant: KING FAHD UNIVERSITY OF PETROLEUM AND MINERALS, Dhahran (SA)

(72) Inventors: Syed Shaheen Shah, Nishikyo-ku (JP); Md. Abdul Aziz, Dhahran (SA); Mansour Al Marzooqi, Riyadh (SA); Zain Hassan Yamani, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 218 days.

(21) Appl. No.: 18/434,193

(22) Filed: Feb. 6, 2024

(65) Prior Publication Data
US 2025/0253100 A1 Aug. 7, 2025

(51) Int. Cl.
*H01G 11/46* (2013.01)
*H01G 11/34* (2013.01)
*H01G 11/52* (2013.01)

(52) U.S. Cl.
CPC ............ *H01G 11/46* (2013.01); *H01G 11/34* (2013.01); *H01G 11/52* (2013.01)

(58) Field of Classification Search
CPC ........ H01G 11/52; H01G 11/68; H01G 11/34; H01G 11/46
See application file for complete search history.

(56) References Cited

U.S. PATENT DOCUMENTS

2011/0240338 A1* 10/2011 Gruner ................... H01G 11/46
977/932

FOREIGN PATENT DOCUMENTS

| CN | 106409527 A | * | 2/2017 | ............ H01G 11/58 |
| CN | 109081342 A | * | 12/2018 | ............ H01G 11/44 |

(Continued)

OTHER PUBLICATIONS

Mahfoz et al., Fabrication of high-performance supercapacitor using date leaves-derived submicron/nanocarbon, Nov. 7, 2022, Journal of Saudi Chemical Society (2022) 26, 101570 (Year: 2022).*

(Continued)

*Primary Examiner* — David M Sinclair
(74) *Attorney, Agent, or Firm* — Oblon, McClelland, Maier & Neustadt, L.L.P.

(57) ABSTRACT

The present invention includes an asymmetric supercapacitor that includes a negative electrode, a positive electrode, an aqueous electrolyte, and a separator. The negative electrode includes a first fluorine-doped tin oxide glass substrate having a first coated surface including a date leaves derived carbon and a first polymer. The asymmetric supercapacitor includes a positive electrode including a second fluorine-doped tin oxide glass substrate having a bismuth vanadate layer. The bismuth vanadate layer is coated with a second composition including the date leaves derived carbon and a second polymer. The separator is located between the positive electrode and the negative electrode, and the electrolyte is present in and on the separator.

20 Claims, 24 Drawing Sheets

(56) References Cited

FOREIGN PATENT DOCUMENTS

| | | | |
|---|---|---|---|
| CN | 113488340 B | 8/2022 | |
| CN | 116598144 A | 8/2023 | |
| EP | 4462973 A2 * | 11/2024 | ............. H01G 11/30 |
| IN | 201611019507 A | 12/2017 | |
| IN | 201741023910 A | 1/2019 | |

OTHER PUBLICATIONS

Phuoc-Anh Le, et al., "Porous carbon materials derived from areca palm leaves for high performance symmetrical solid-state supercapacitors", Journal of Materials Science, vol. 55, Apr. 27, 2020, pp. 10751-10764 (Abstract only).

Salisu Nasir, et al., "Development of New Carbon-Based Electrode Material from Oil Palm Waste-Derived Reduced Graphene Oxide and Its Capacitive Performance Evaluation", Journal of Nanomaterials, Article ID: 1970365, Nov. 29, 2019, 13 pages.

\* cited by examiner

LIGHT-RESPONSIVE SUPERCAPACITOR BASED ON DATE LEAVES DERIVED CARBON AND BIVO$_4$ PHOTOCAPACITIVE ELECTRODES

STATEMENT OF ACKNOWLEDGEMENT

The inventors acknowledge the support provided by the Interdisciplinary Research Center for Hydrogen and Energy Storage (IRC-HES), King Fahd University of Petroleum and Minerals, Saudi Arabia, through project INHE-2105.

BACKGROUND

Technical Field

The present disclosure is directed to a supercapacitor, particularly a light-responsive supercapacitor based on date leaves derived carbon and BiVO$_4$ photocapacitive electrodes.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Electrical energy is a part of everyday life and plays a role in powering devices and supporting society. Advanced energy storage systems have sparked interest as the global environment changes, driven by the ongoing need for renewable and sustainable energy sources. The development of renewable energy sources, like solar and wind power, emphasizes the need for effective and dependable energy storage systems. Creating high-performance energy storage technologies, such as batteries and supercapacitors, is needed for establishing a future with sustainable energy. Batteries and supercapacitors are widely used in portable electronic devices, electric and hybrid vehicles, and grid-scale energy storage systems with different properties used in various applications. Batteries have a higher energy density than supercapacitors and can store more energy in a smaller space; however, batteries have several challenges, such as limited charge-discharge cycles, that often make supercapacitors a more attractive option in specific applications. Having limited charge-discharge cycles means the batteries will eventually degrade and need to be replaced. Supercapacitors, on the other hand, can last for millions of cycles. Batteries typically take a longer time to charge compared with supercapacitors and have a relatively high self-discharge rate, meaning they lose their charge over time, even when unused. Supercapacitors, on the other hand, have a much lower self-discharge rate. Battery production further involves a series of complex processes, increasing production costs compared to supercapacitors. Some batteries experience thermal runaways that pose safety risks if mistreated, whereas supercapacitors are generally considered safer than batteries. Because of these challenges, supercapacitors are increasingly used in applications where high-power density, quick charge and discharge rate, and long cycle life are favored, including use in electric vehicles, wind and solar power plants, grid stabilization, and other applications.

Supercapacitors, often classified into electrical double-layer capacitors (EDLCs) and pseudo capacitors, store energy either via electrostatic charge accumulation at the electrode/electrolyte interface or through fast and reversible Faradaic redox reactions, respectively. Both supercapacitors have advantages and disadvantages, and different types of supercapacitors are suited to different applications depending on their unique characteristics. A supercapacitor includes components, such as electrodes, electrolytes, current collectors, containers, and terminals. Normally, supercapacitors use an external electric power source for charging, limiting their applicability in remote or off-grid areas.

Integrating energy generation and storage in a single device, such as a light-responsive (photo-charging) supercapacitor, has emerged as a promising solution for using supercapacitors in remote areas. These devices harness solar energy, an abundant and renewable source, and directly convert and store it as electrical energy, thereby mitigating the need for an electric charging source. These devices can potentially revolutionize how energy is generated, stored, and used, particularly in the field of renewable energy. Some possible applications of light-responsive supercapacitors include powering small electronic devices, such as cell phones and laptops, as well as larger systems such as electric cars and homes. They also have the potential to reduce dependence on fossil fuels and decrease greenhouse gas emissions. Furthermore, they can also be used as a power source for self-powered light and motion sensors. A light-responsive supercapacitor typically uses photoactive materials, such as bismuth vanadate (BiVO$_4$) and zinc oxide, as electrodes. These materials can convert light energy into electrical energy, which can then be stored in a device Light-responsive supercapacitors can be used in various applications, such as a standalone energy storage unit or integrated into devices such as wearable electronics, smart windows, solar cells, sensor networks, and the like.

Dye-sensitized solar cells (DSSCs) and light-responsive supercapacitors are both technologies that use light-responsive materials to convert light into electrical energy. DSSCs are mainly used for electricity generation, while light-responsive supercapacitors are mainly used for energy storage. DSSCs convert sunlight into electricity using semiconducting materials, such as titanium dioxide, and a photosensitizing dye. Light-responsive supercapacitors store energy for later use. DSSCs convert light energy into electrical energy through a photovoltaic process, in which the photosensitizing dye absorbs light and excites electrons in the semiconducting material. The excited electrons are then transferred to an electrode, generating a current.

Light-responsive supercapacitors convert light energy into electrical energy through a photoconductive process, in which a photoconductive material absorbs light and excites electrons in the material. These excited electrons are then stored in the supercapacitor. DSSCs can convert sunlight into electricity, but they typically cannot store as much energy as supercapacitors. DSSCs are mainly used in applications such as solar panels and portable solar power generators, while light-responsive supercapacitors have a wide range of applications, such as powering small electronic devices, electric vehicles, and grid-scale energy storage. Light-responsive supercapacitors are a relatively new and developing technology, and as such, they face several challenges that need to be addressed before they can be widely adopted.

Although several methods have been developed in the past, there still exists a need to synthesize an easy and cost-effective method of preparation of a light-responsive supercapacitor that may circumvent the drawbacks of prior art. Accordingly, an object of the present disclosure is to develop a light-responsive supercapacitor based on date leaves derived carbon and $BiVO_4$ photocapacitive electrodes.

SUMMARY

In an exemplary embodiment, an asymmetric supercapacitor is described. The asymmetric supercapacitor includes a negative electrode including a first fluorine-doped tin oxide glass substrate. The first fluorine-doped tin oxide glass substrate has a first coated surface. The first coated surface is a first composition including a date leaves derived carbon and a first polymer. The asymmetric supercapacitor includes a positive electrode including a second fluorine-doped tin oxide glass substrate. The second fluorine-doped tin oxide glass substrate has a second coated surface. The second coated surface is a bismuth vanadate layer. The bismuth vanadate layer is coated with a second composition including the date leaves derived carbon and a second polymer. The asymmetric supercapacitor includes an aqueous electrolyte and a separator. The separator is between the positive electrode and the negative electrode, and the electrolyte is present in and on the separator.

In some embodiments, the date leaves derived carbon is in the form of nanoparticles having an average diameter of 20 to 500 nanometers (nm).

In some embodiments, the bismuth vanadate layer includes bismuth vanadate particles included of bismuth vanadate nanoparticles.

In some embodiments, the bismuth vanadate particles have an average diameter of 0.5 to 5 micrometers ($\mu$m).

In some embodiments, the bismuth vanadate nanoparticles have an average diameter of 50 to 300 nm.

In some embodiments, the negative electrode is made by a process including rinsing date leaves, drying the date leaves, cutting the date leaves; heating the date leaves in a tube furnace at 800 to 900° C. for 2 to 4 hours under a nitrogen atmosphere with a heating rate of 10° C./minute and a cooling rate of 5° C./minute to form a pyrolysis date leaf product; pulverizing the pyrolysis date leaf product; ball-milling the pulverized pyrolysis date leaf product to form the date leaves derived carbon; mixing the date leaves derived carbon with the first polymer in an N-methyl-2-pyrrolidone to form a reaction mixture; drop-casting the reaction mixture onto the first fluorine-doped tin oxide glass substrate; and drying to form the negative electrode.

In some embodiments, a ratio of the date leaf date leaves derived carbon to the first polymer is 85:15 percent weight by weight to 95:5 percent weight by weight.

In some embodiments, the ball-milling occurs at a rate of 3000 rpm for 15 hours with zirconium balls having a diameter from 600 to 800 $\mu$m and a ratio of the pulverized pyrolysis date leaf product to the zirconium balls of 1:20 by weight.

In some embodiments, the positive electrode is made by a process including mixing a hydrated bismuth salt, an acid, and a first base to form a first solution; stirring a second base into the first solution to form a second solution; heating the second fluorine-doped tin oxide glass substrate in the second solution to form a bismuth film on the second fluorine-doped tin oxide glass substrate; rinsing the bismuth film on the fluorine-doped tin oxide glass substrate; drying the bismuth film on the second fluorine-doped tin oxide substrate; dissolving a vanadium compound in dimethyl sulfoxide to form a third solution; drop-casting the third solution on the bismuth film on the second fluorine-doped tin oxide glass substrate; thermally annealing the vanadium to the bismuth film on the second fluorine-doped tin oxide glass substrate to form a thermally annealed material; soaking the thermally annealed material in a basic solution; rinsing and drying the thermally annealed material; mixing the date leaves derived carbon with the second polymer in an N-methyl-2-pyrrolidone to form a fourth solution; and drop-casting the fourth solution onto the thermally annealed material and drying to form the positive electrode.

In some embodiments, the thermal annealing is done at a temperature of 400 to 500° C., for a time of 90 to 150 minutes, and at a heating ramp of 0.5 to 5° C./min.

In some embodiments, the first polymer is a polyvinylidene fluoride.

In some embodiments, the aqueous electrolyte includes sodium sulfate.

In some embodiments, the separator is a cellulose membrane saturated with the aqueous electrolyte.

In some embodiments, the supercapacitor has a capacitance retention after 12,000 charge-discharge cycles of 85 to 95% of a first charge-discharge.

In some embodiments, the supercapacitor has a specific capacitance of 140 to 160 faradays per gram (F/g) at a current density of 0.4 to 0.6 amperes per gram (A/g).

In some embodiments, the supercapacitor has an energy density of 22 to 30 watt-hours per kilogram (Wh/kg) at a power density of 200 watts per kilogram (W/kg) in the presence of light.

In some embodiments, the supercapacitor has an energy density of 10 to 15 Wh/kg at a power density of 200 W/kg in the absence of light.

In some embodiments, the supercapacitor has a specific capacitance of 220 to 260 F/g at a scan rate of 10 millivolts per second (mV/sec) under light.

In some embodiments, the supercapacitor has a Coulombic efficiency of 80 to 90% after 12,000 charge-discharge cycles at a current density of 10 A/g.

In some embodiments, the supercapacitor has a specific capacitance of 280 to 300 F/g and a discharging time of 450 to 470 seconds after a charging time of 1000 to 1400 seconds with an 8 W light-emitting diode (LED) light bulb at a current density of 0.5 A/g.

The foregoing general description of the illustrative embodiments and the following detailed description thereof are merely exemplary aspects of the teachings of this disclosure and are not restrictive. These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A more complete appreciation of the present disclosure (including alternatives and/or variations thereof) and many of the attendant advantages thereof will be readily obtained as the same becomes better understood by reference to the following detailed description of the embodiments when considered in connection with the accompanying drawings, wherein.

Figure 1A:
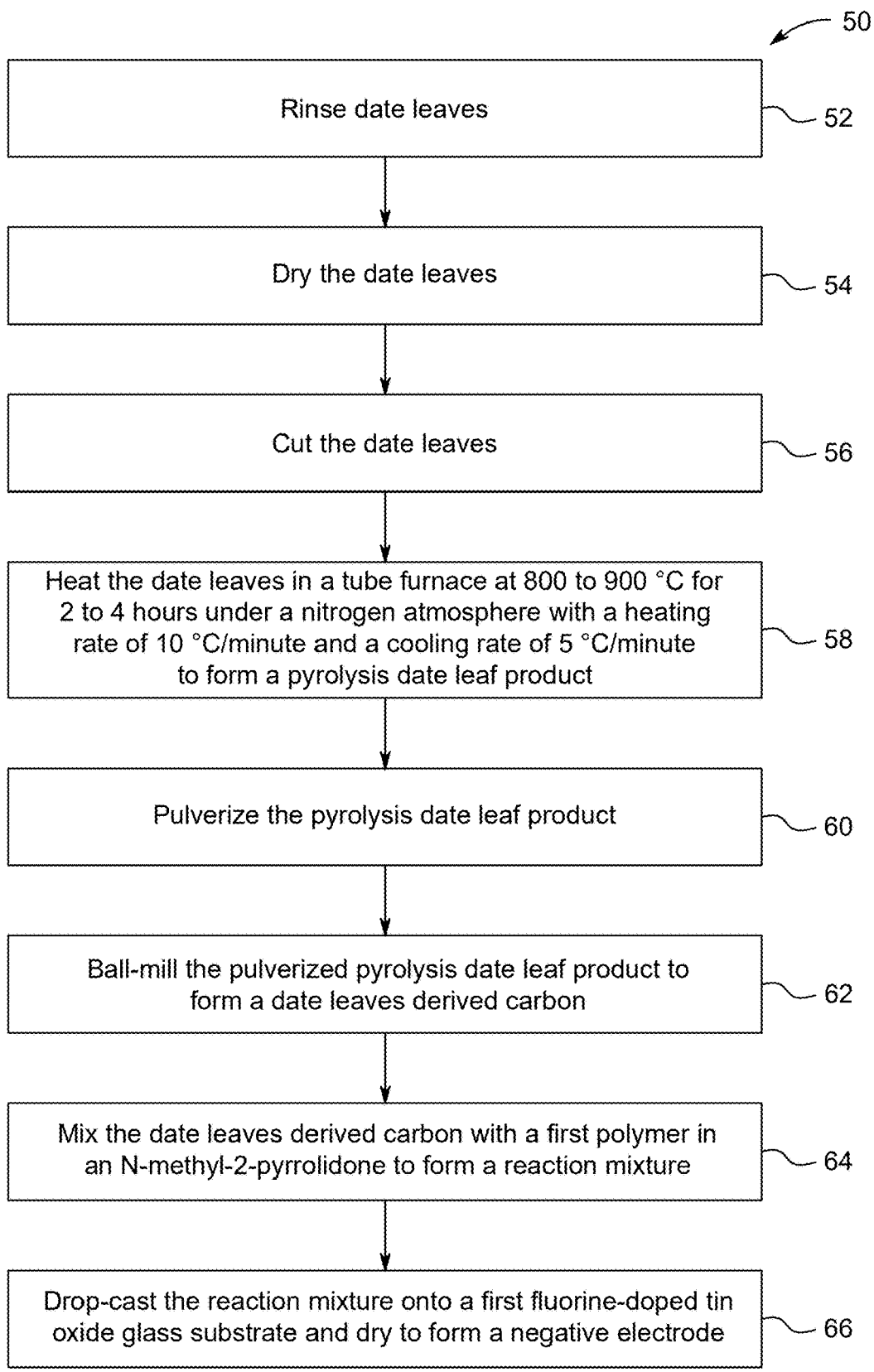
FIG. 1A is a schematic flow chart of a process of making a negative electrode of a light-responsive supercapacitor device, according to certain embodiments.
Figure 1B:
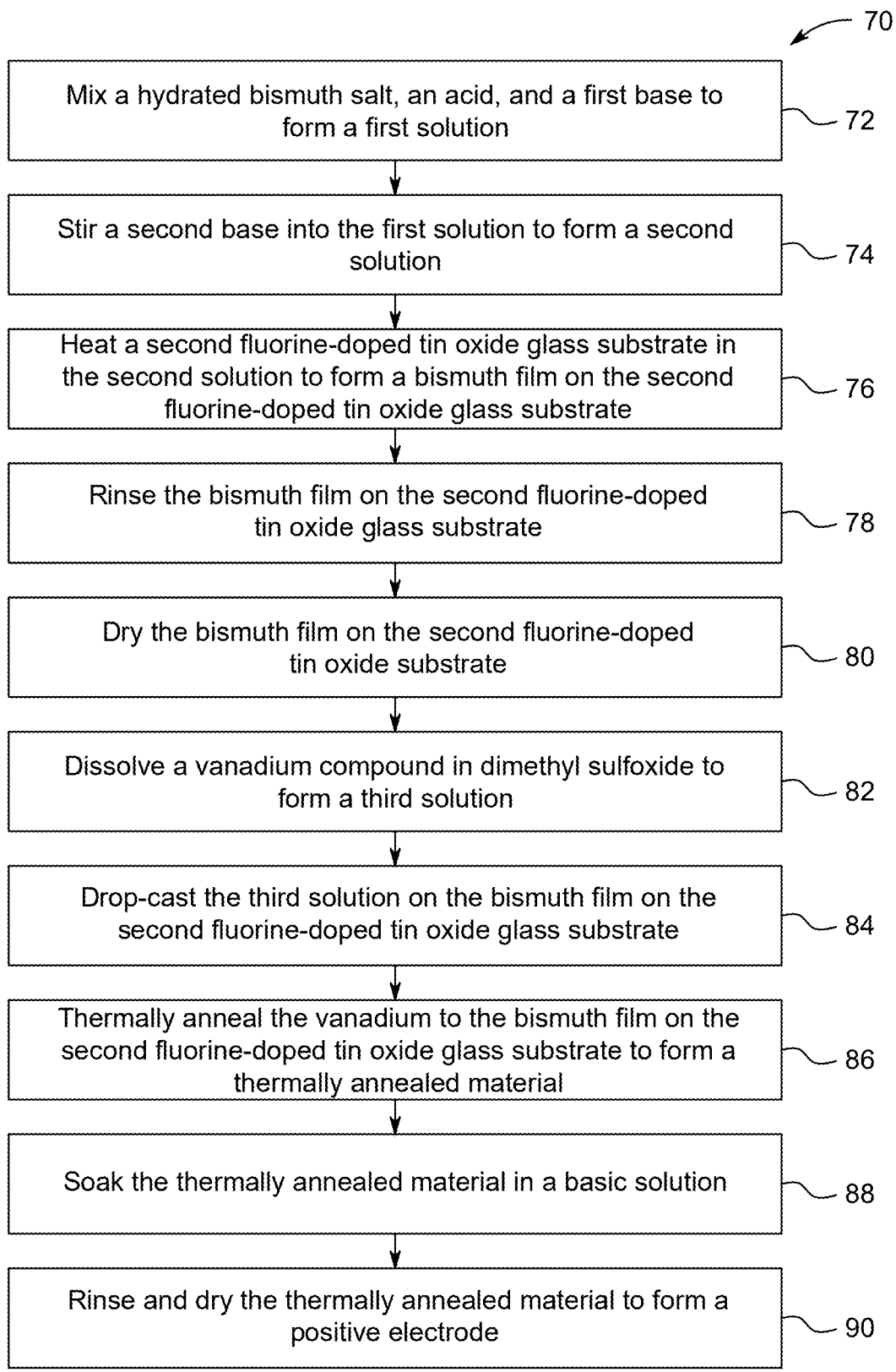
FIG. 1B is a schematic flow chart of a process of making a bismuth vanadate fluorine-doped tin oxide ($BiVO_4$/FTO)
Figure 1C:
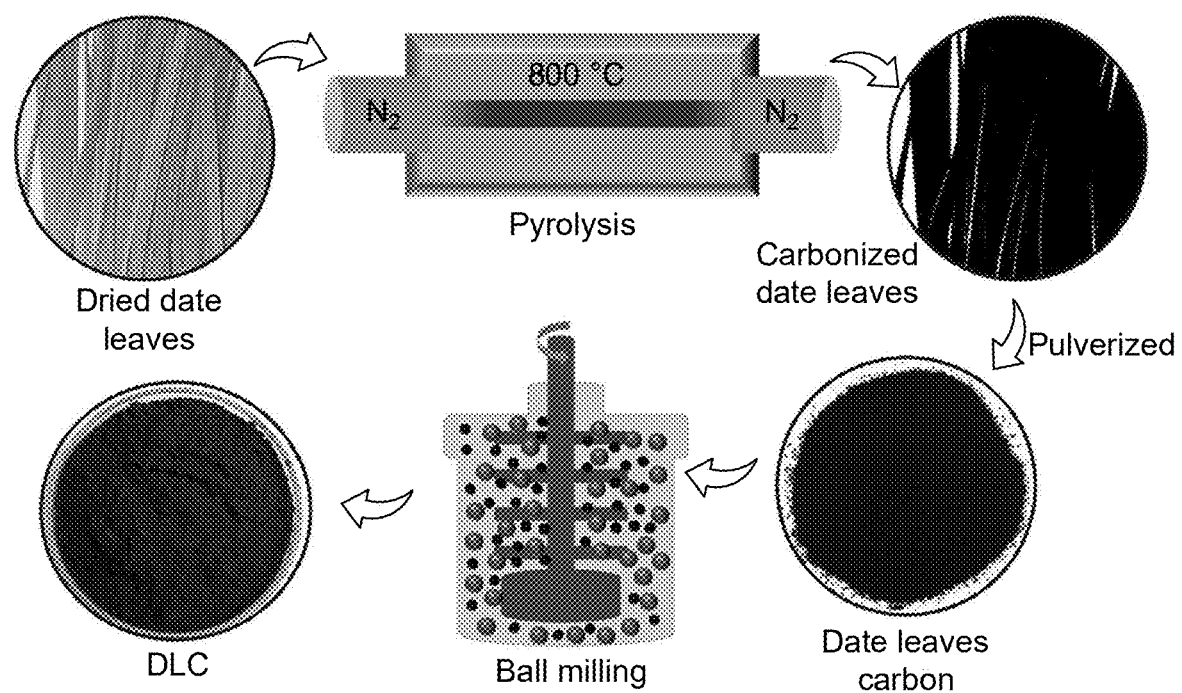
Figure 2:
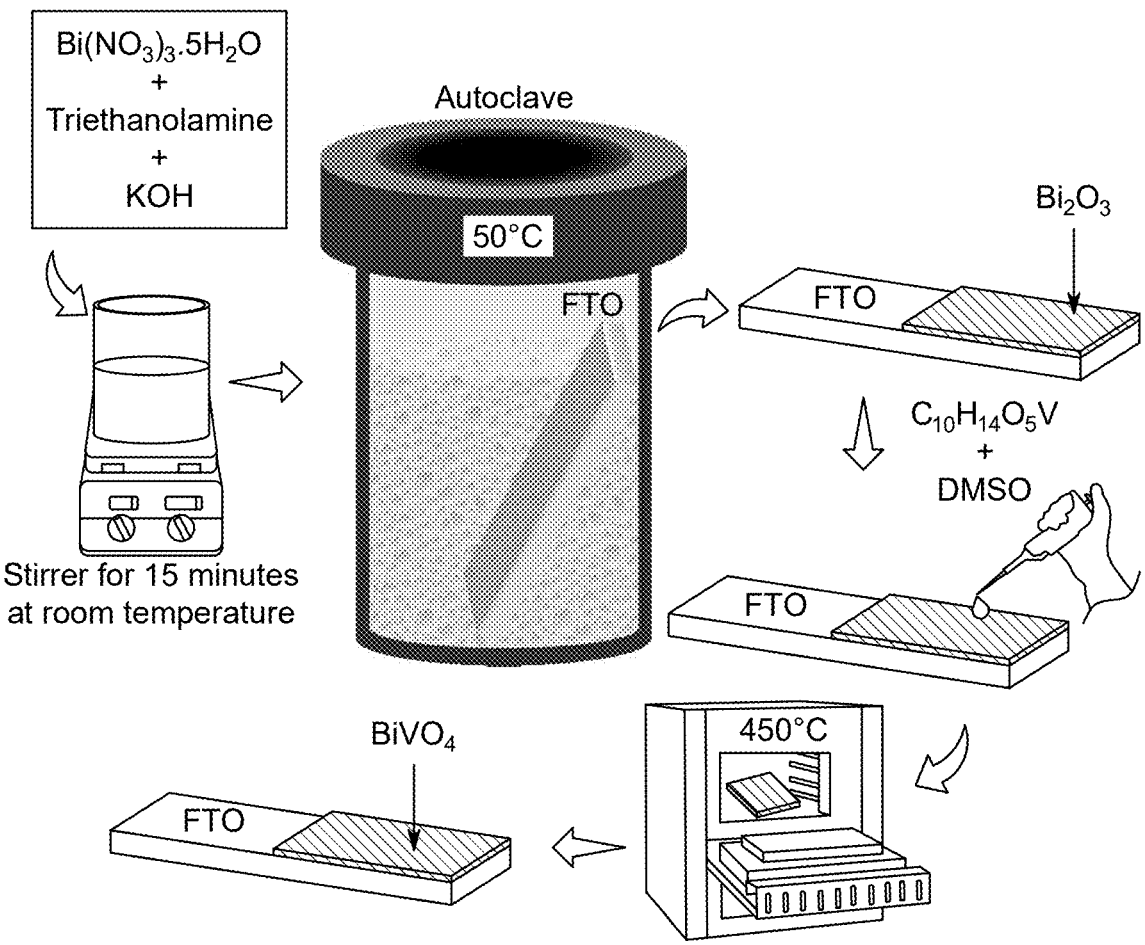
Figure 3:
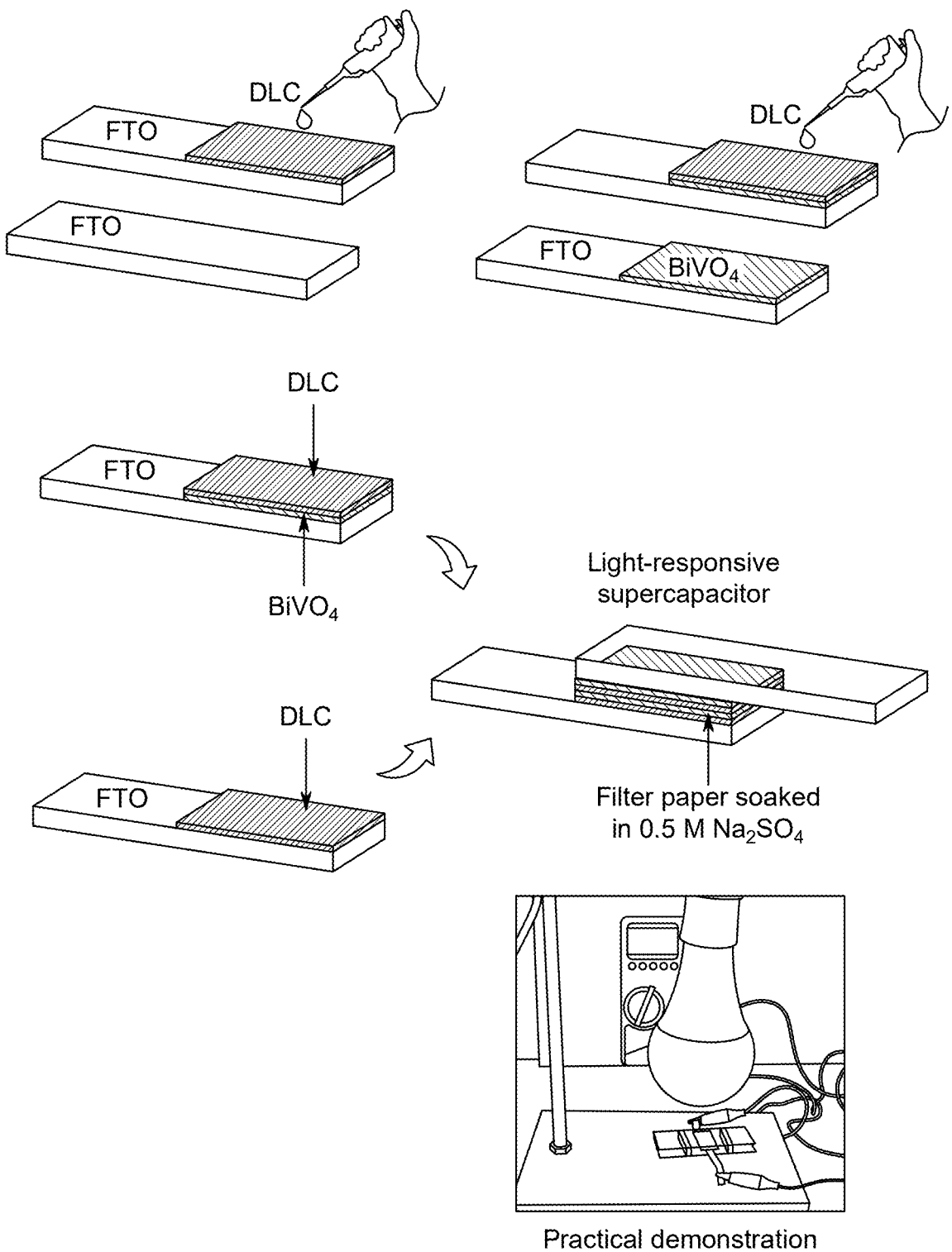
Figure 4A:
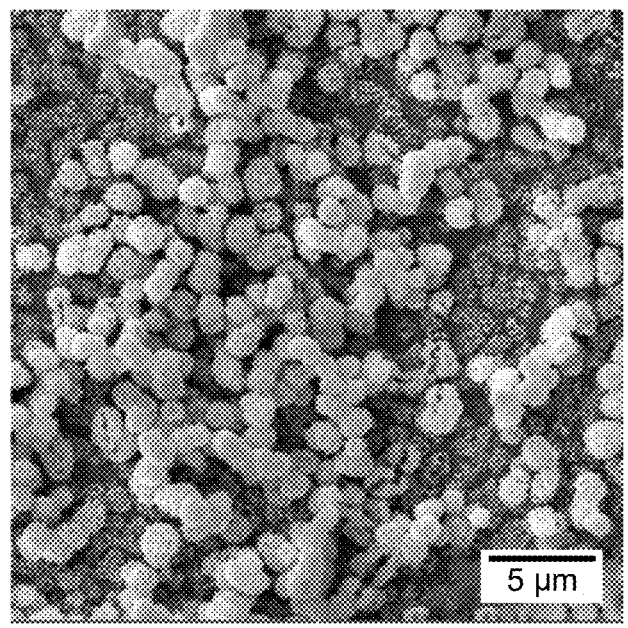
Figure 4B:
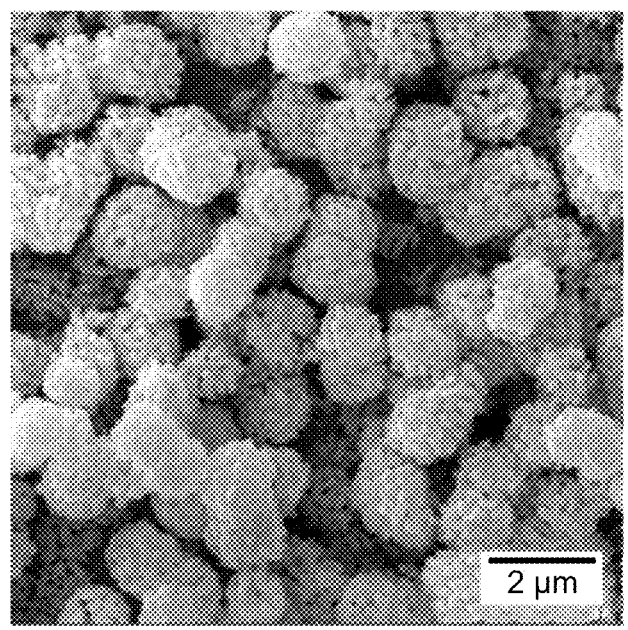
Figure 4C:
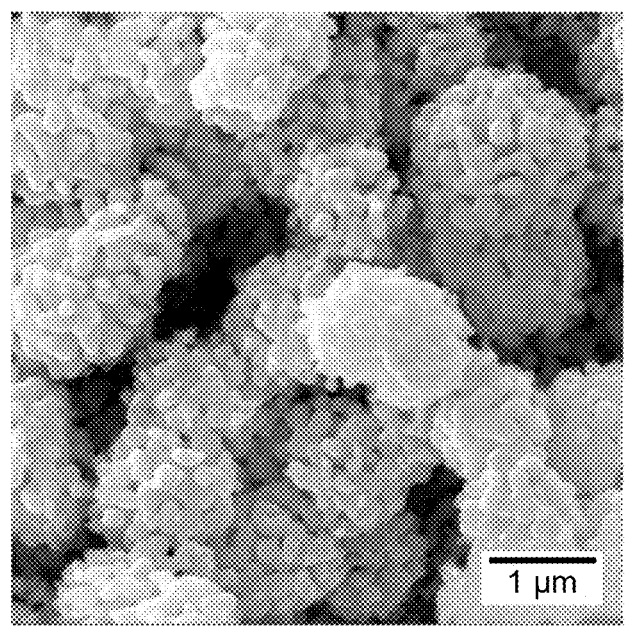
Figure 4D:
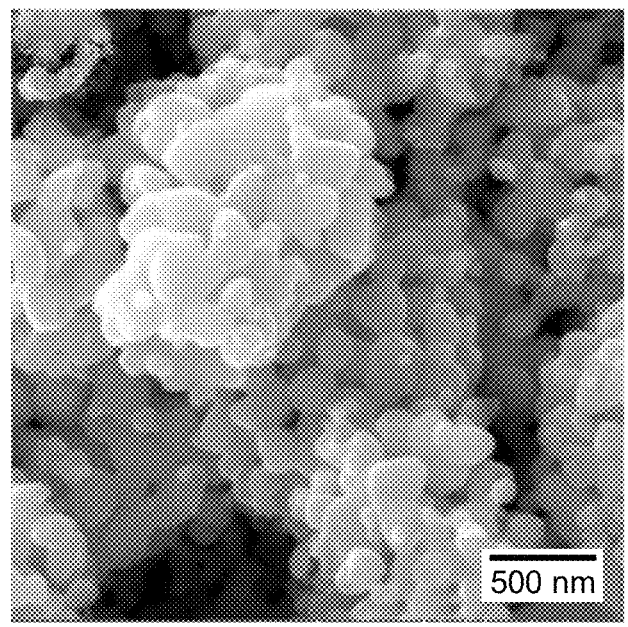
Figure 4E:
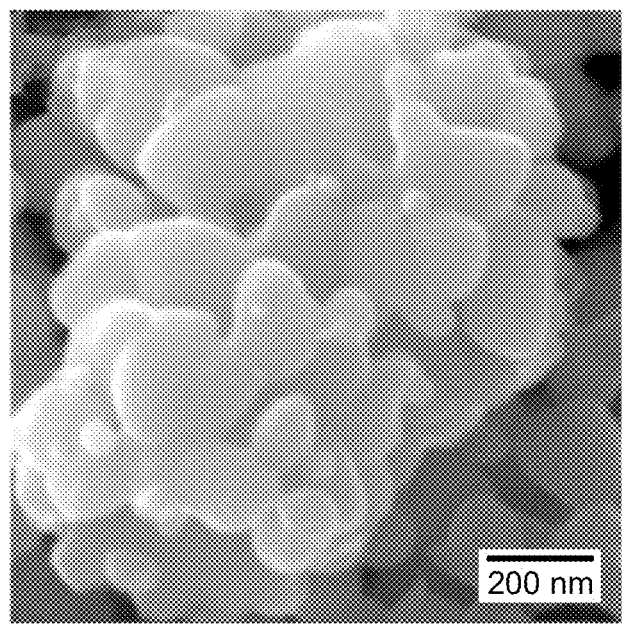
Figure 4F:
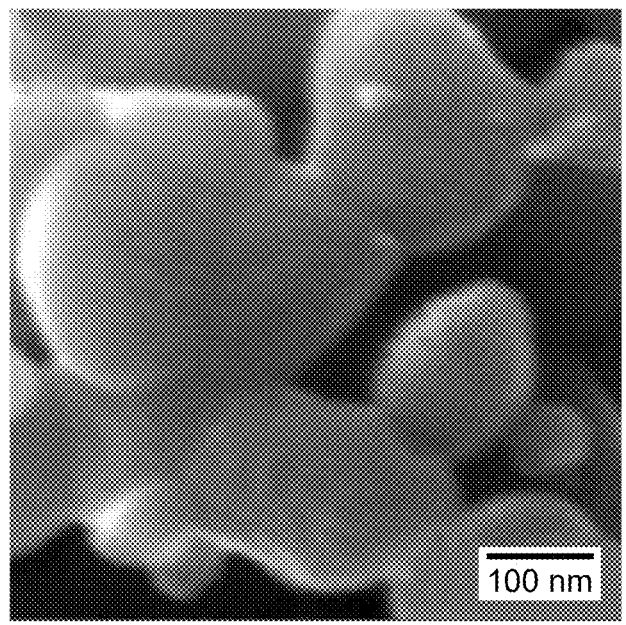
Figure 4G:
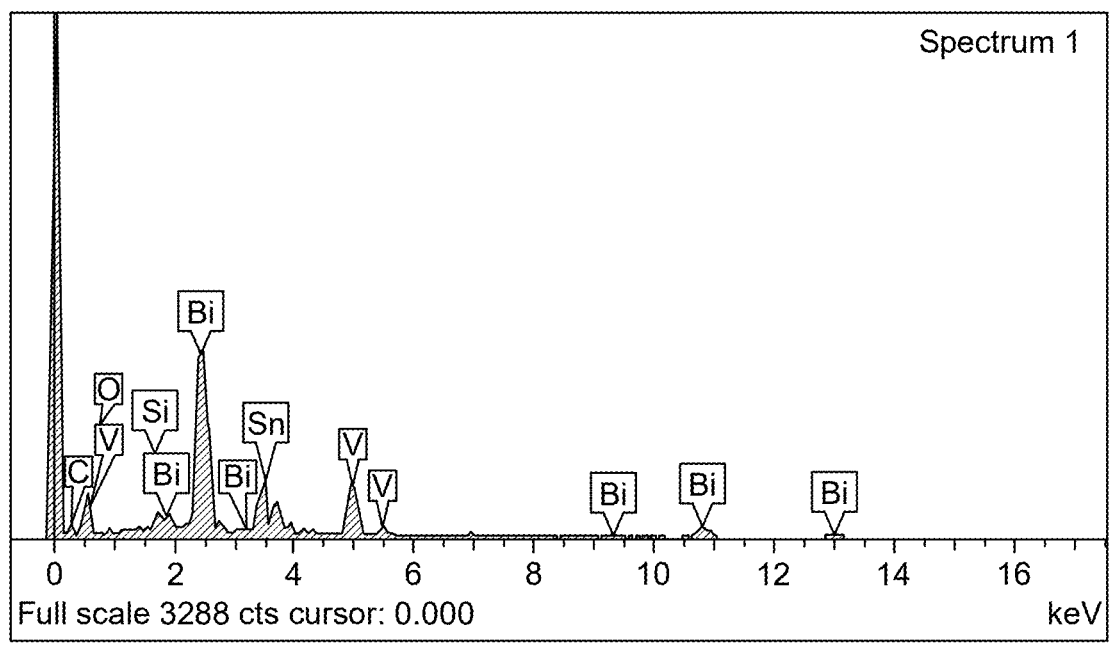
Figure 5A:
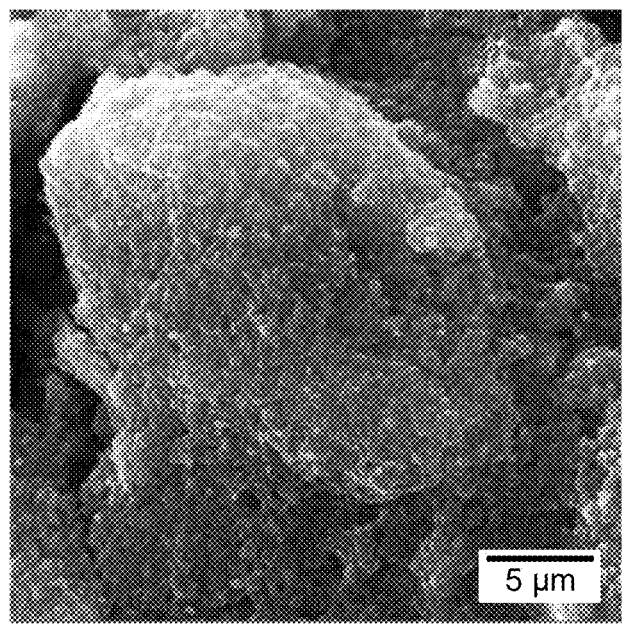
Figure 5B:
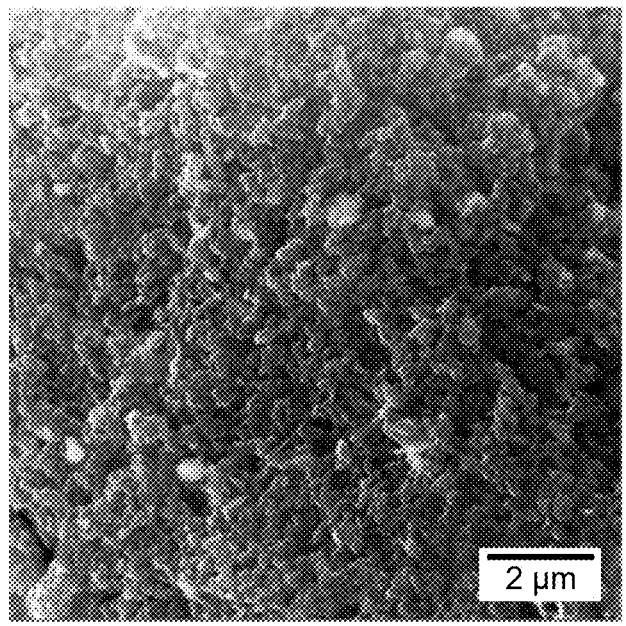
Figure 5C:
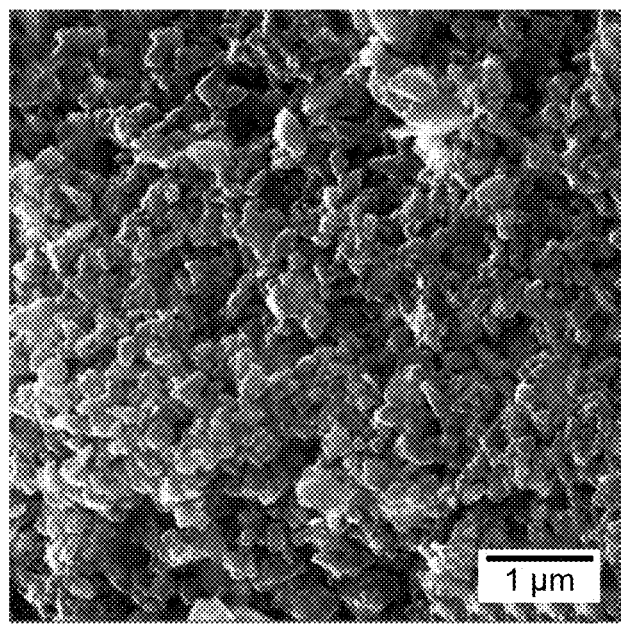
Figure 5D:
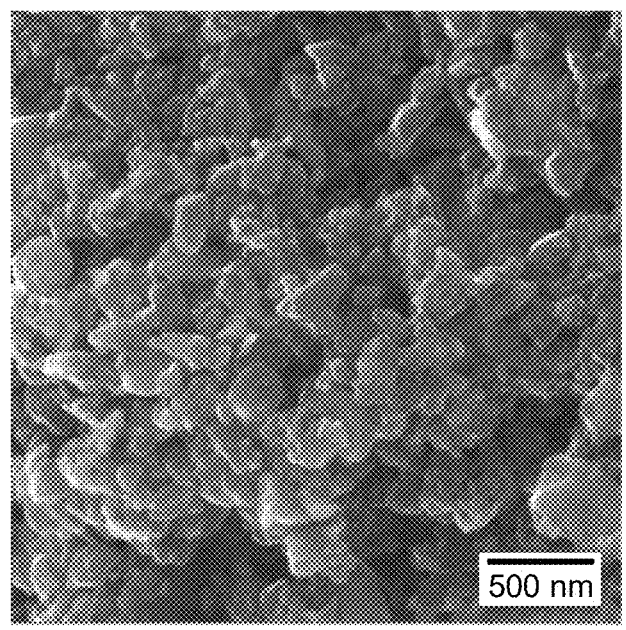
Figure 5E:
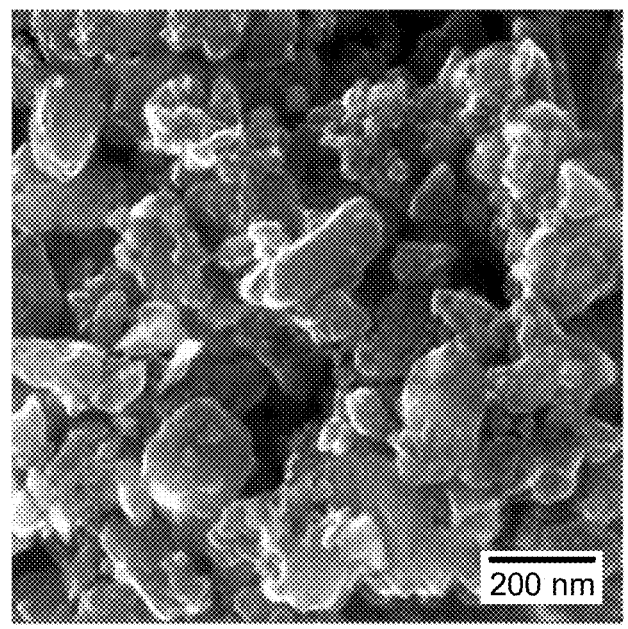
Figure 5F:
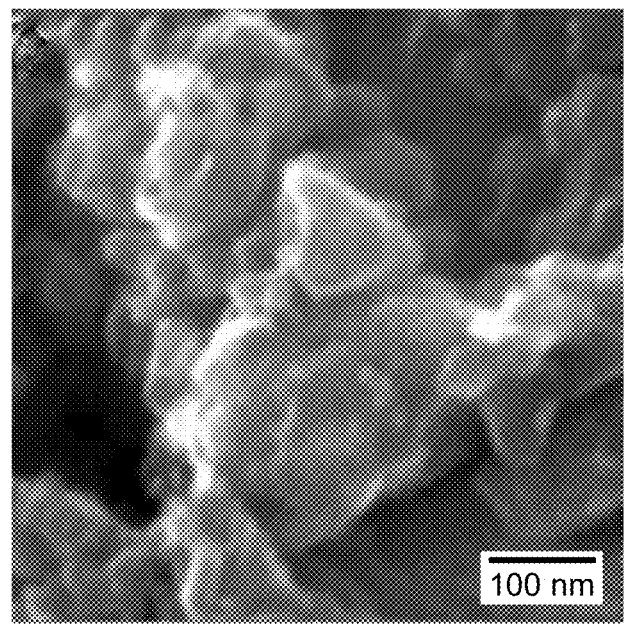
Figure 5G:
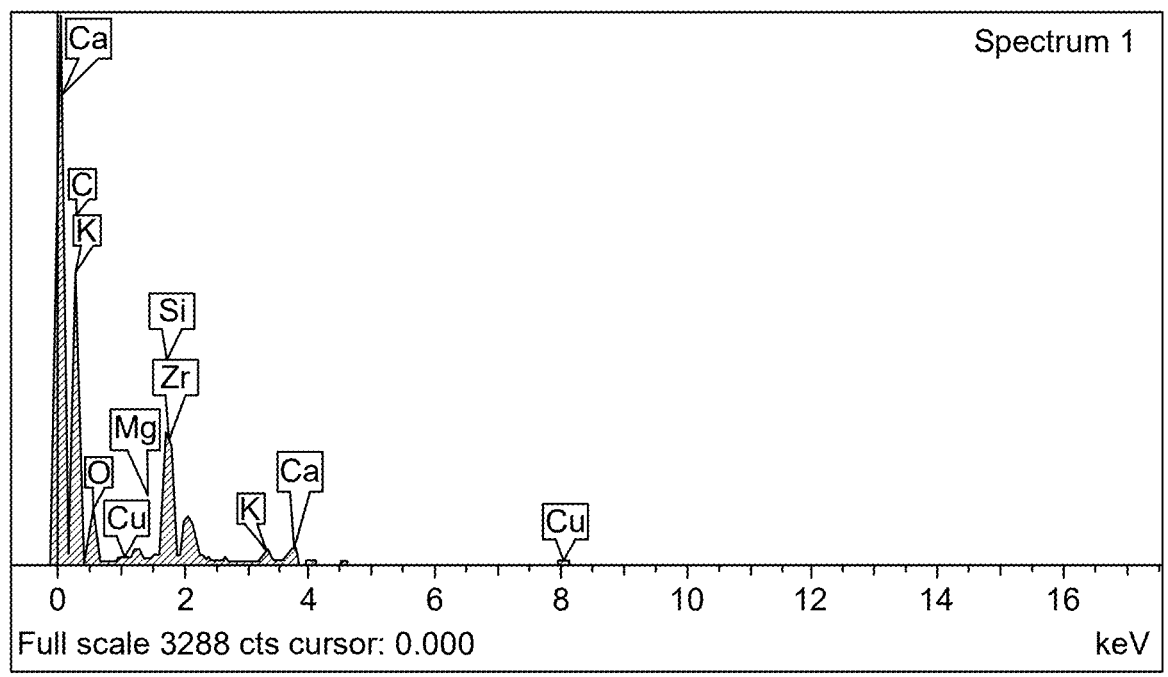
Figure 6A:
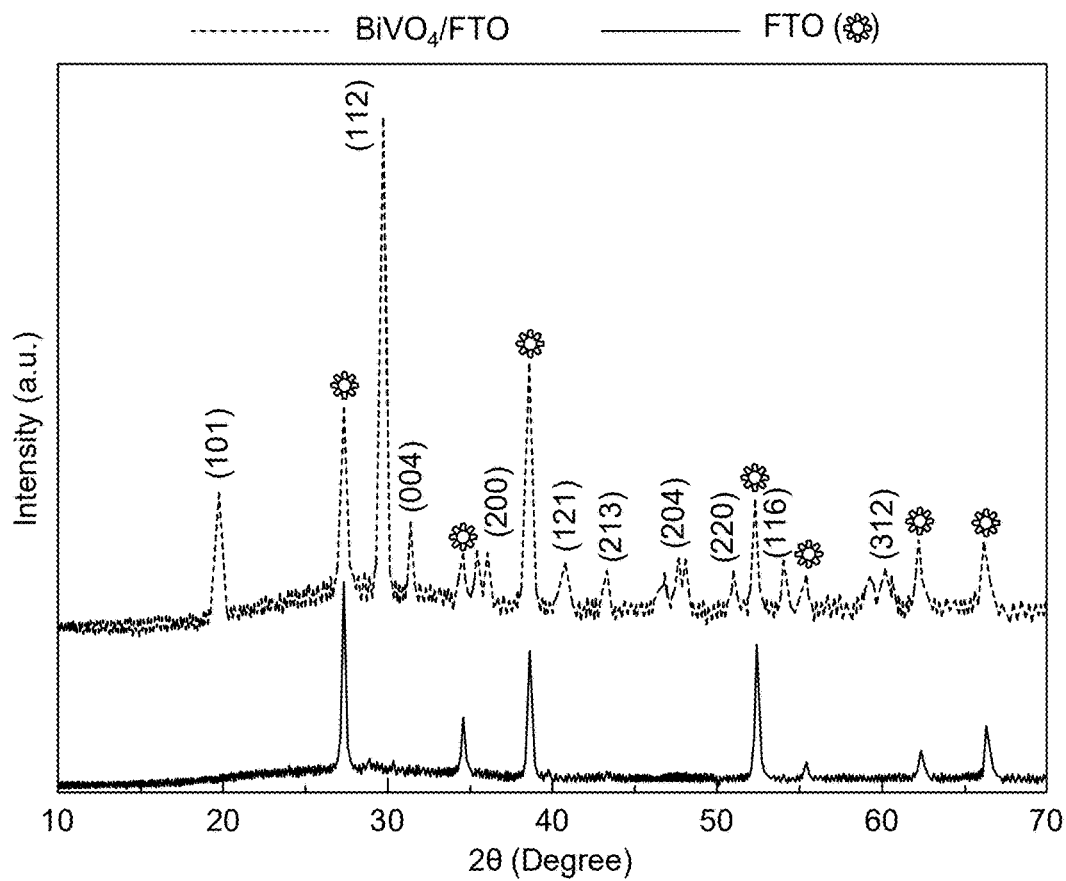
Figure 6B:
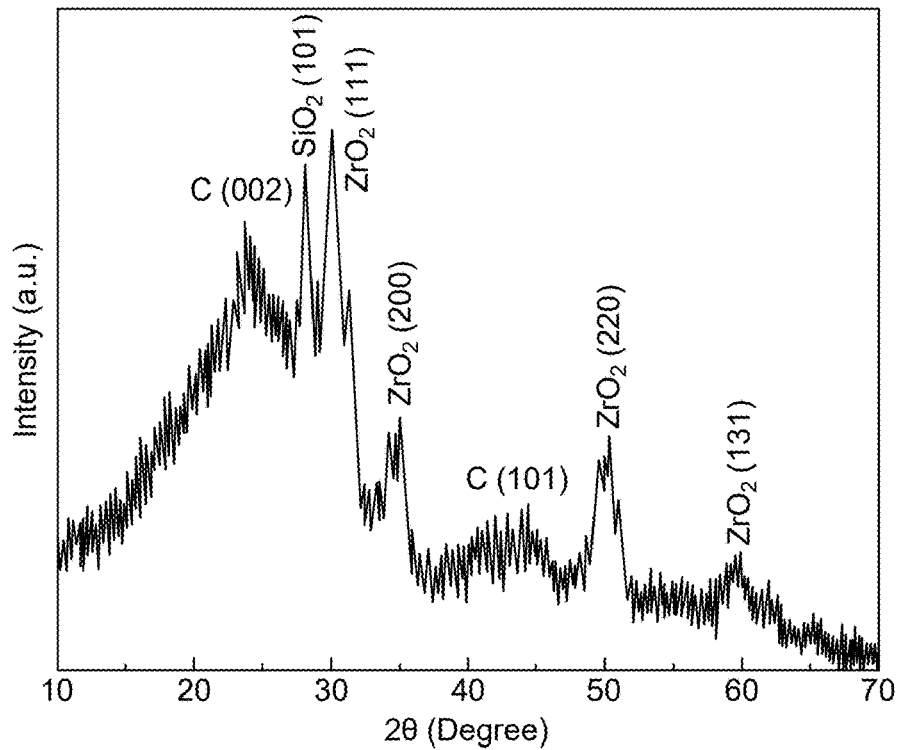
Figure 6C:
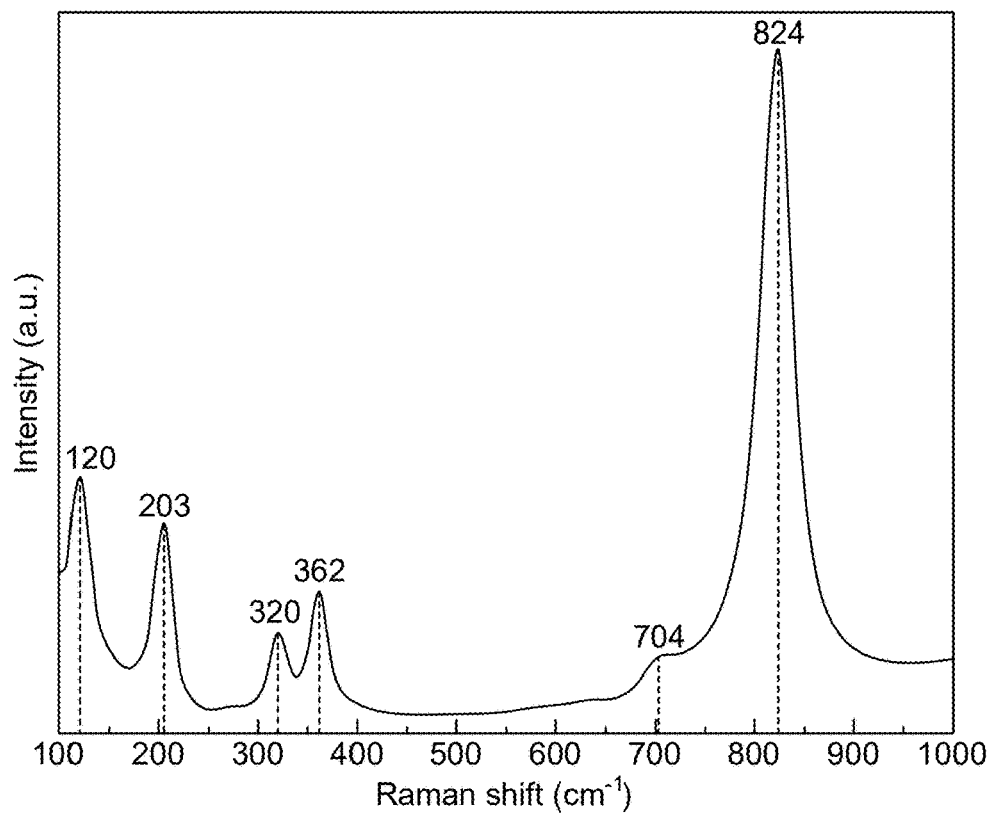
Figure 6D:
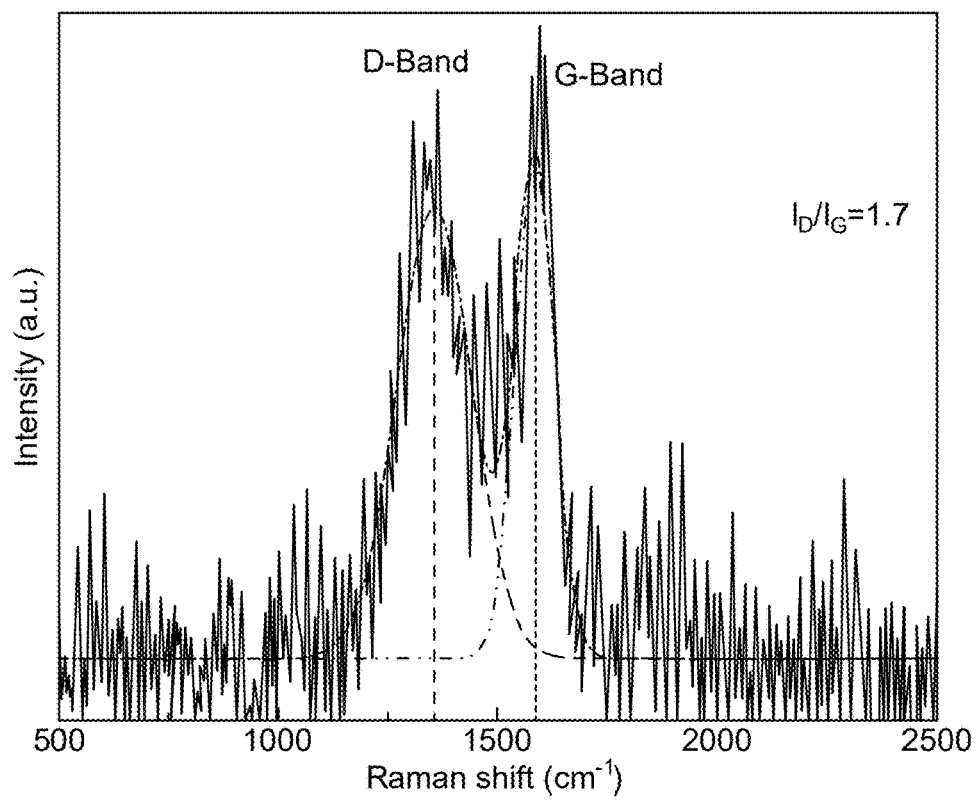
Figure 7A:
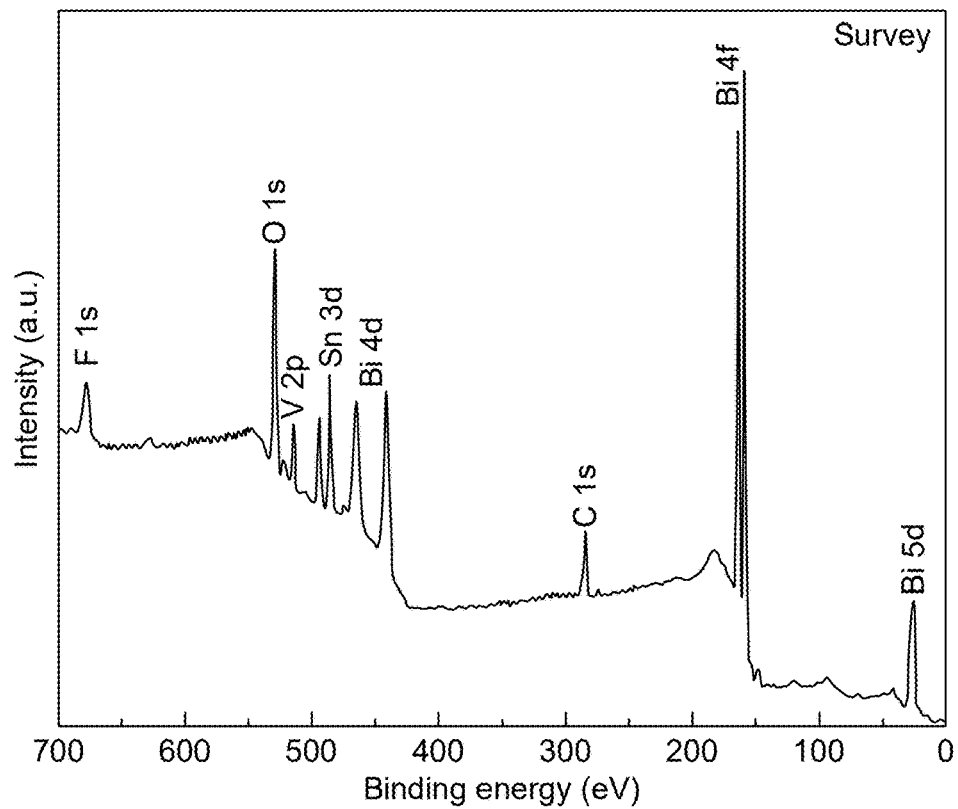
Figure 7B:
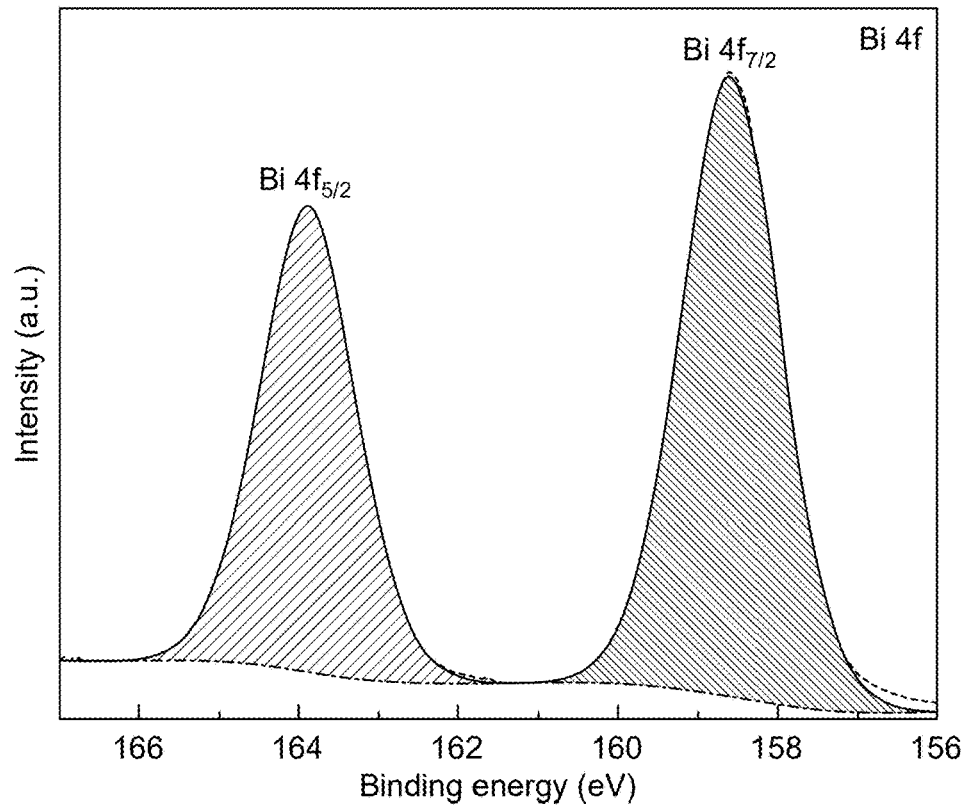
Figure 7C:
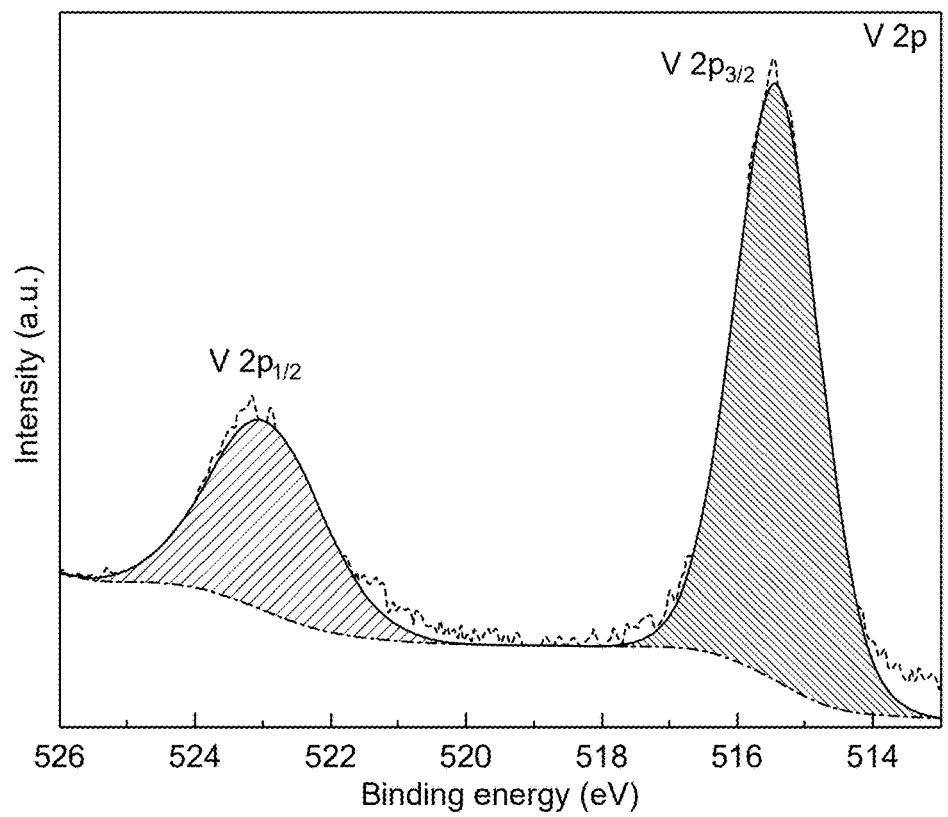
Figure 7D:
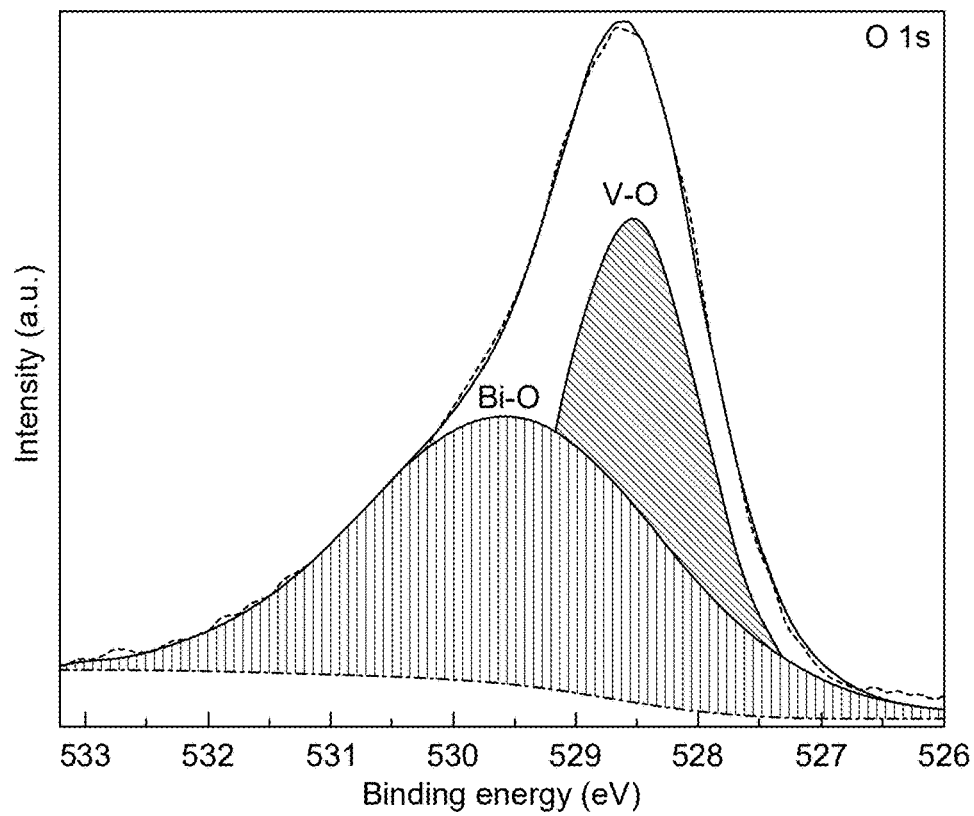
Figure 8A:
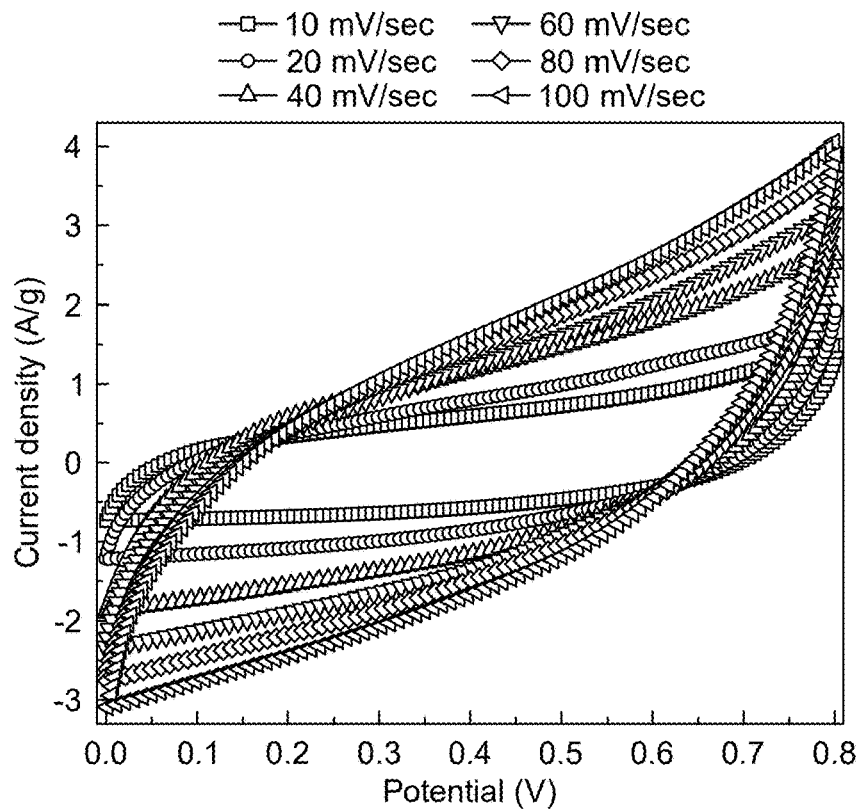
Figure 8B:
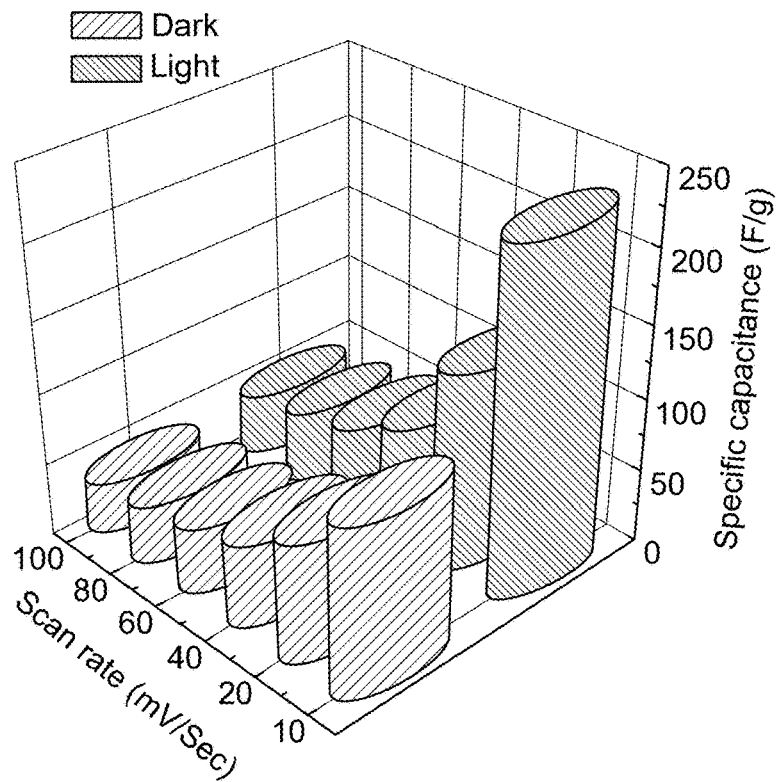
Figure 8C:
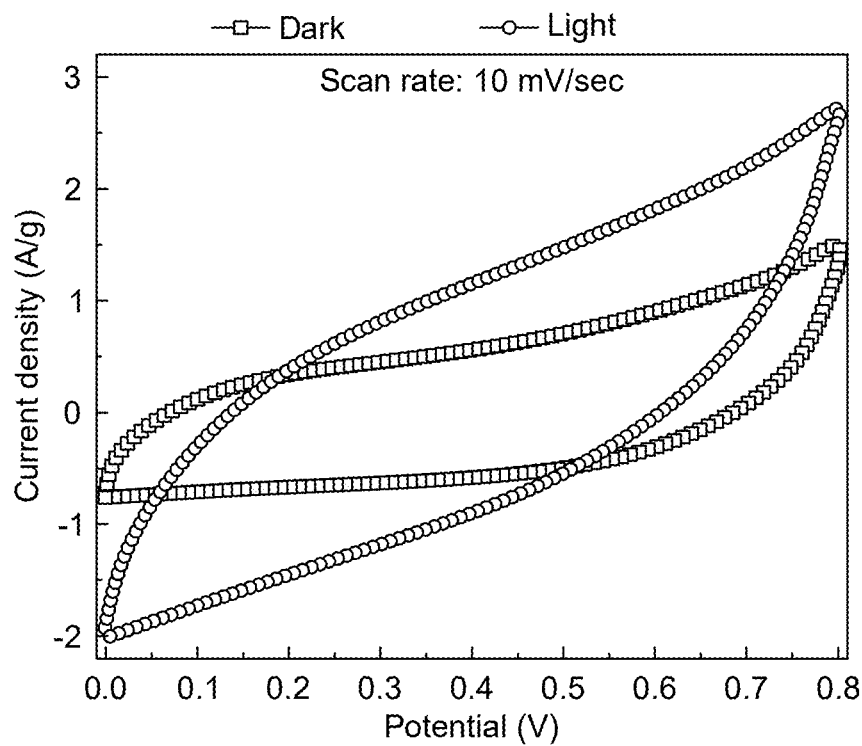
Figure 8D:
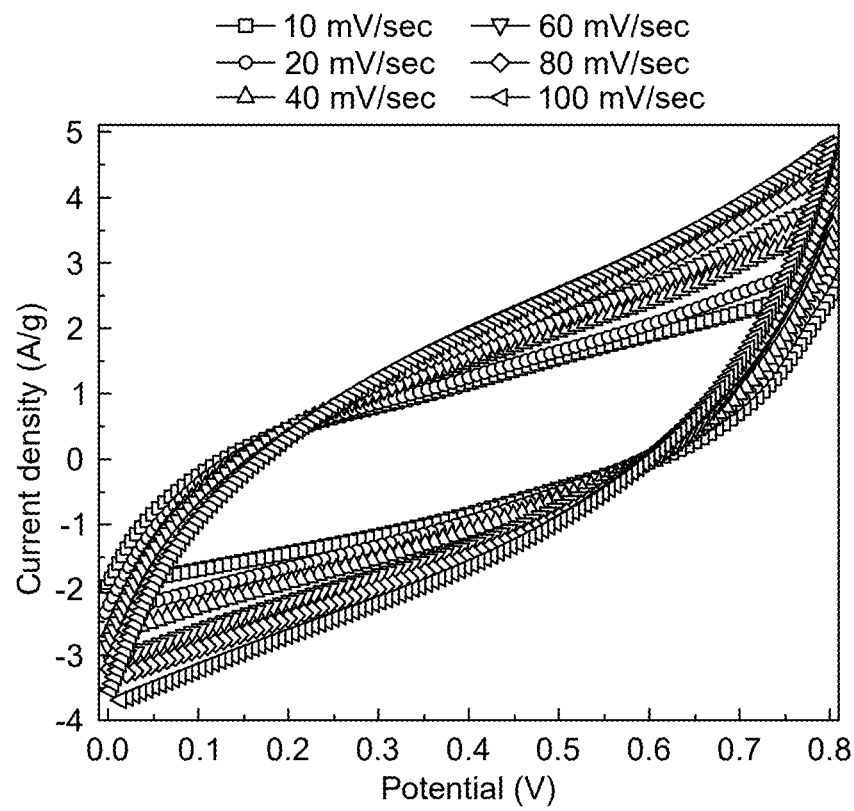
Figure 9A:
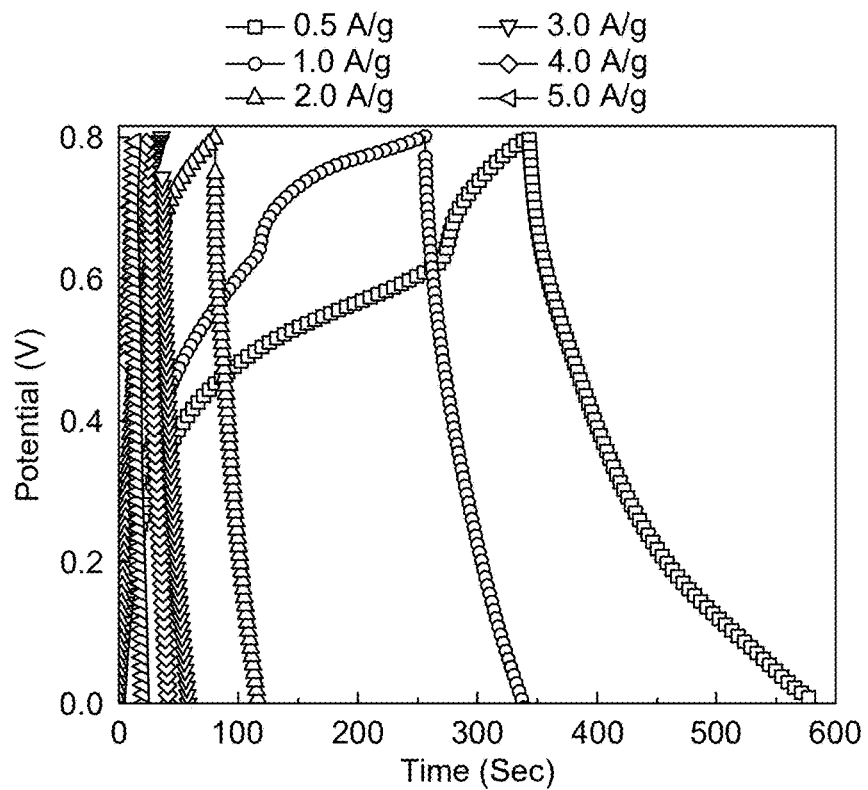
Figure 9B:
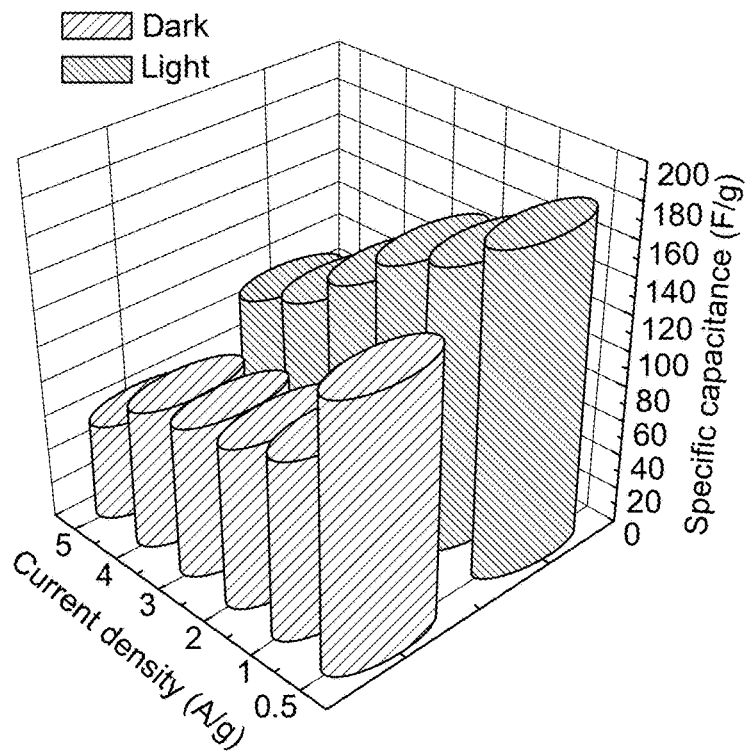
Figure 9C:
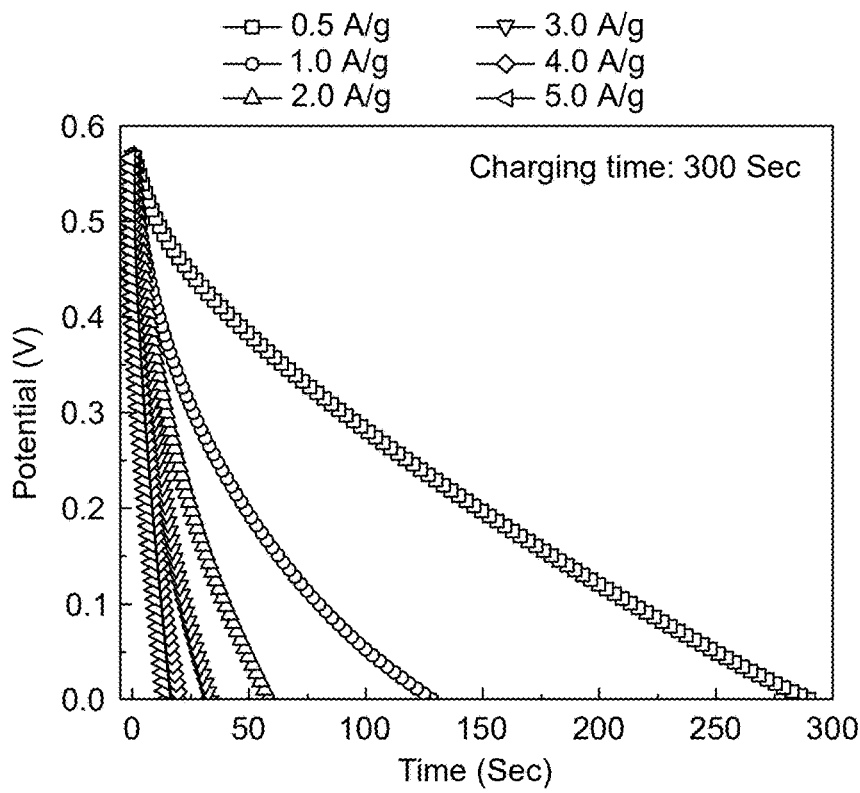
Figure 9D:
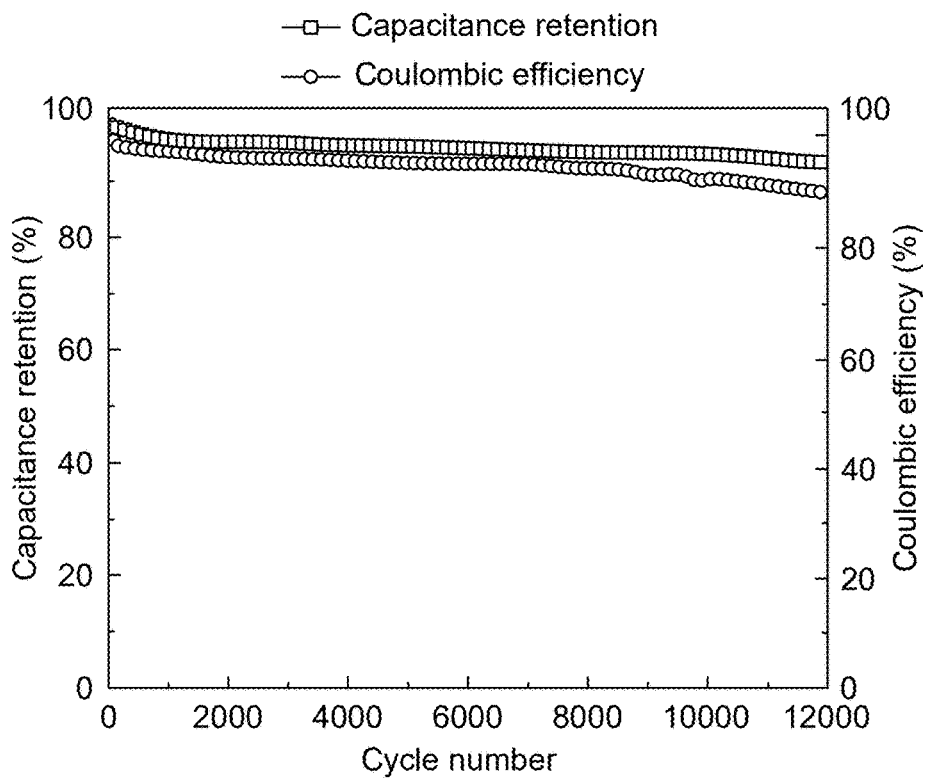
Figure 10A:
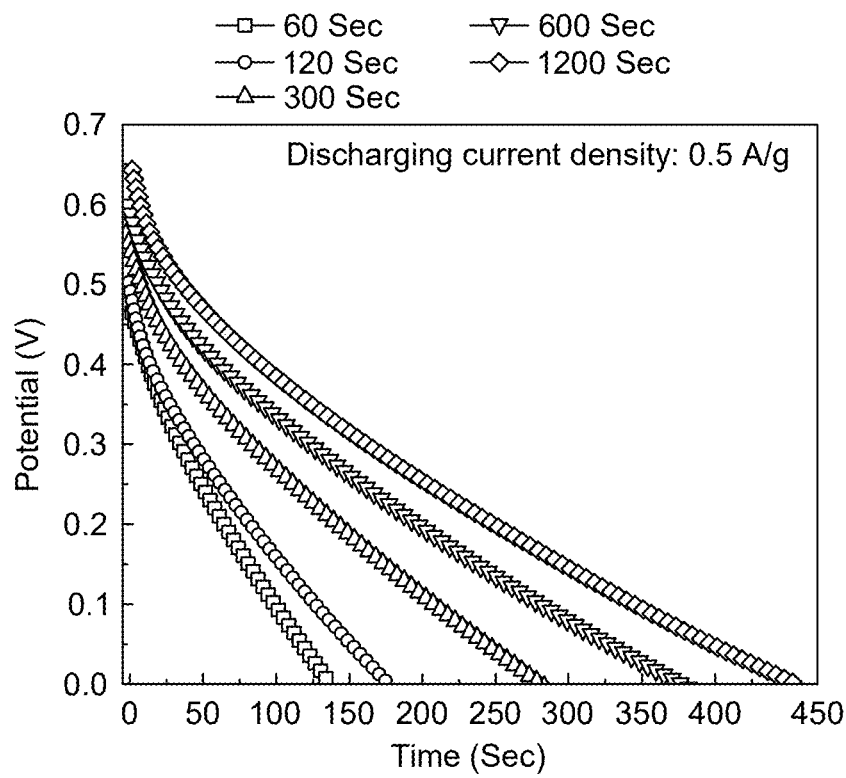
Figure 10B:
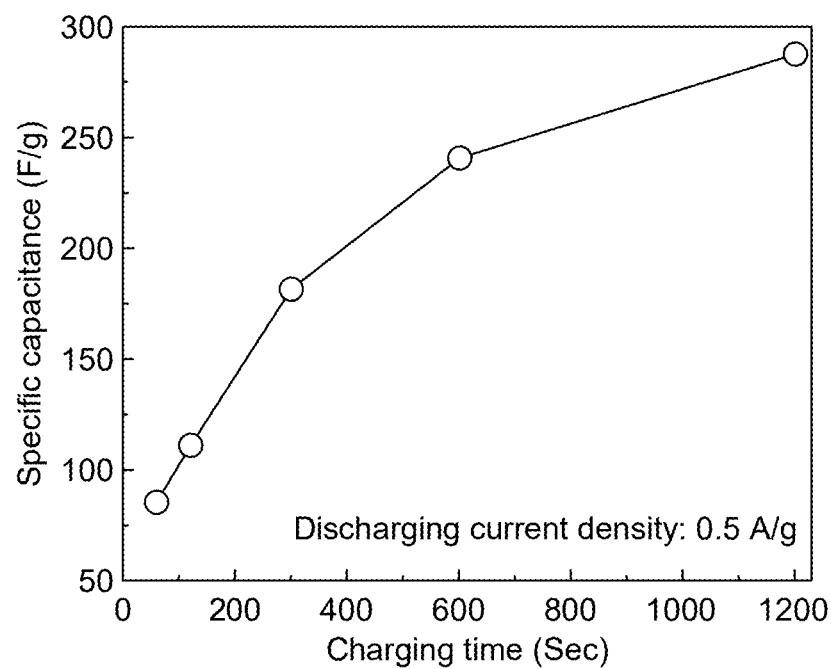
Figure 10C:
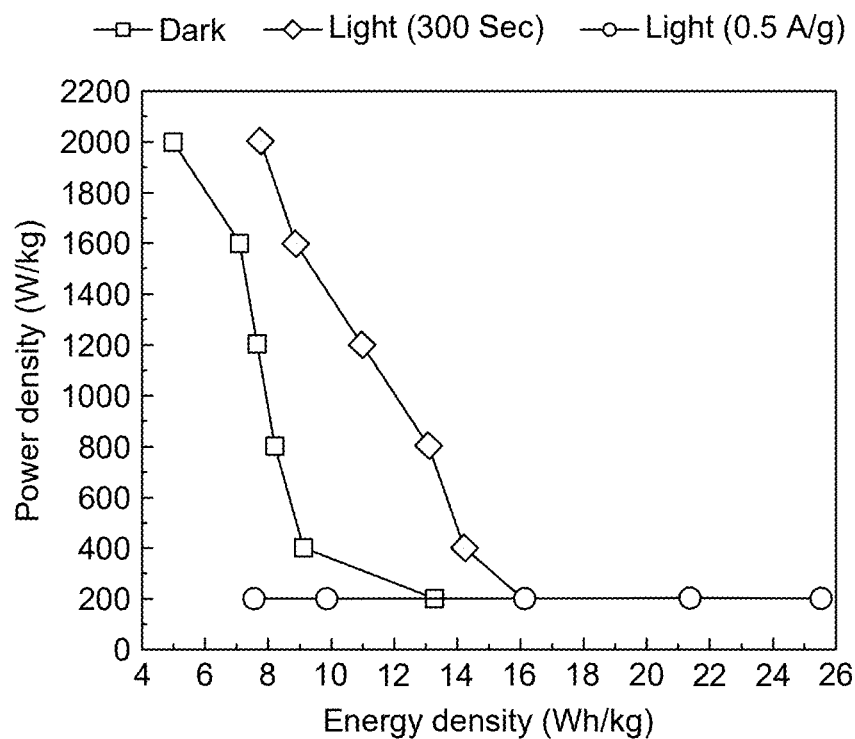
Figure 10D:
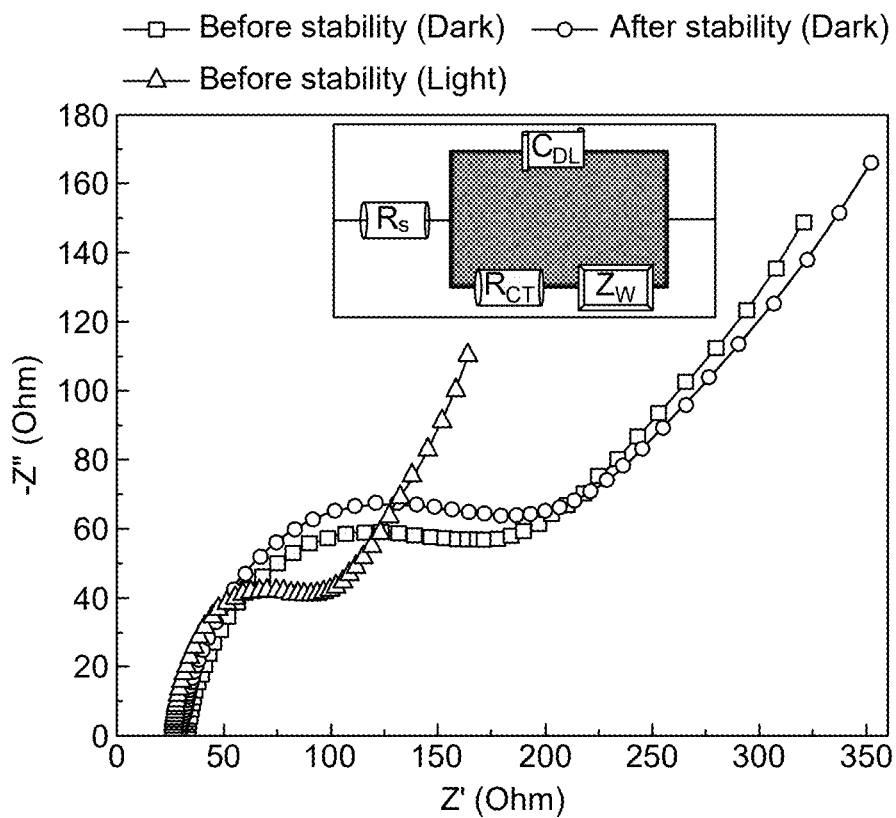
Figure 11:
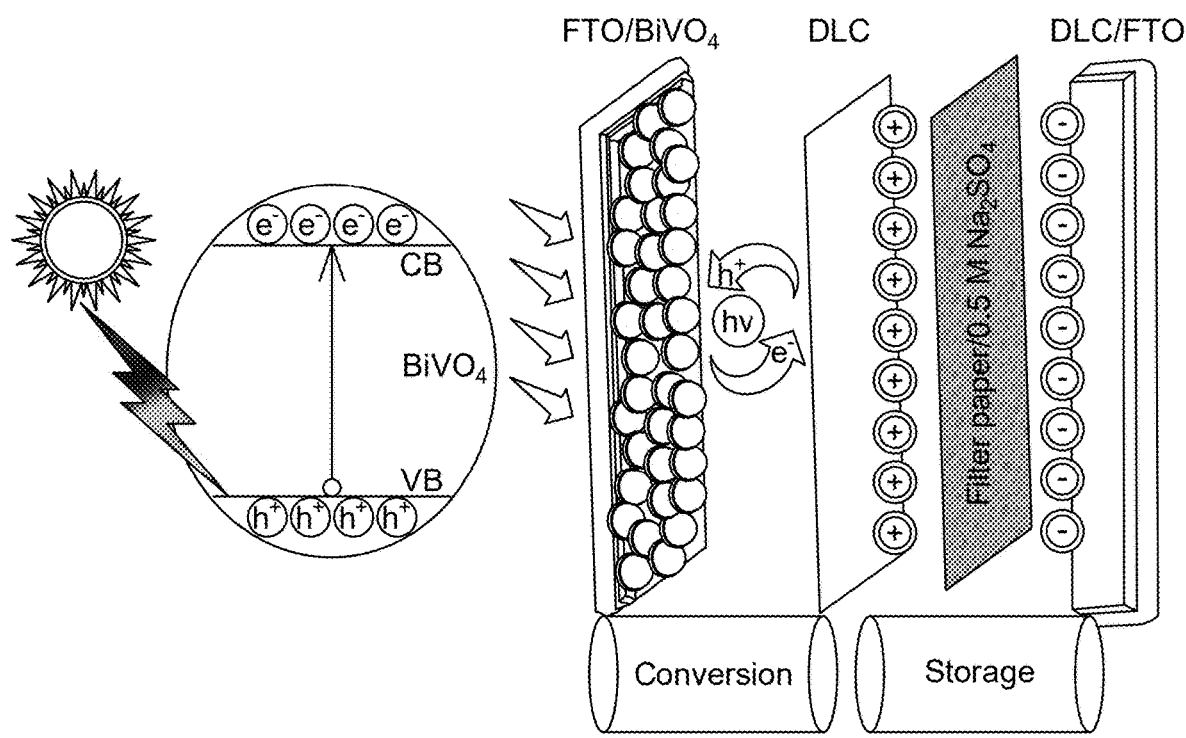

electrode of the light-responsive supercapacitor device, according to certain embodiments;

FIG. 1C is a schematic illustration for a double-layer capacitor (DLC) preparation via pyrolysis followed by ball milling, according to certain embodiments;

FIG. 2 is a schematic representation for the preparation of $Bi_2O_3$ on a fluorine-doped tin oxide (FTO) substrate, and further thermal annealing to ingrown $BiVO_4$ films on the FTO substrate, according to certain embodiments;

FIG. 3 is a schematic representation of the light-responsive supercapacitor device fabrication and its practical demonstration, according to certain embodiments;

FIG. 4A depicts field emission scanning electron microscopy (FESEM) image of $BiVO_4$/FTO at 5 micrometers (μm), according to certain embodiments;

FIG. 4B depicts FESEM image of the $BiVO_4$/FTO at 2 μm, according to certain embodiments;

FIG. 4C depicts FESEM image of the $BiVO_4$/FTO at 1 μm, according to certain embodiments;

FIG. 4D depicts FESEM image of the $BiVO_4$/FTO at 500 nanometers (nm), according to certain embodiments;

FIG. 4E depicts FESEM image of the $BiVO_4$/FTO at 200 nm, according to certain embodiments;

FIG. 4F depicts FESEM image of the $BiVO_4$/FTO at 100 nm, according to certain embodiments;

FIG. 4G depicts energy dispersive X-ray spectroscopy (EDS) spectrum of the $BiVO_4$/FTO, according to certain embodiments;

FIG. 5A depicts FESEM image of the DLC at 5 μm, according to certain embodiments;

FIG. 5B depicts FESEM image of the DLC at 2 μm, according to certain embodiments;

FIG. 5C depicts FESEM image of the DLC at 1 μm, according to certain embodiments;

FIG. 5D depicts FESEM image of the DLC at 500 nm, according to certain embodiments;

FIG. 5E depicts FESEM image of the DLC at 200 nm, according to certain embodiments;

FIG. 5F depicts FESEM image of the DLC at 100 nm, according to certain embodiments;

FIG. 5G depicts EDS spectrum of the DLC, according to certain embodiments;

FIG. 6A depicts X-ray diffraction (XRD) spectra of $BiVO_4$/FTO and FTO, according to certain embodiments;

FIG. 6B depicts XRD spectrum of the DLC, according to certain embodiments;

FIG. 6C depicts Raman spectroscopy spectrum of $BiVO_4$/FTO, according to certain embodiments;

FIG. 6D depicts Raman spectroscopy spectrum of the DLC, according to certain embodiments;

FIG. 7A depicts X-ray photoelectron spectroscopy (XPS) survey spectrum of the $BiVO_4$/FTO photoelectrode, according to certain embodiments;

FIG. 7B depicts XPS high-resolution deconvoluted spectra of Bi 4f of the $BiVO_4$/FTO photoelectrode, according to certain embodiments;

FIG. 7C depicts XPS high-resolution deconvoluted spectra of V 2p of the $BiVO_4$/FTO photoelectrode, according to certain embodiments;

FIG. 7D depicts XPS high-resolution deconvoluted spectra of O 1s of the $BiVO_4$/FTO photoelectrode, according to certain embodiments;

FIG. 8A depicts cyclic voltammetry (CV) curves at different scan rates (10, 20, 40, 60, 80, 100 millivolts per second (mV/sec)) recorded in the dark for the fabricated asymmetric light-responsive supercapacitor (FTO/$BiVO_4$/DLC acted as a positive electrode and DLC/FTO as a negative electrode), according to certain embodiments;

FIG. 8B depicts obtained specific capacitances from CV curves at different scan rates (10, 20, 40, 60, 80, 100 mV/sec) under dark and light conditions for the fabricated asymmetric light-responsive supercapacitor, according to certain embodiments;

FIG. 8C depicts comparison of CV curves under dark and light conditions at a scan rate of 10 mV/sec for the fabricated asymmetric light-responsive supercapacitor, according to certain embodiments;

FIG. 8D depicts CV curves at different scan rates (10, 20, 40, 60, 80, 100 mV/sec) recorded under the light for the fabricated asymmetric light-responsive supercapacitor, according to certain embodiments;

FIG. 9A depicts galvanostatic charge-discharge (GCD) profiles at different current densities (0.5, 1.0, 2.0, 3.0, 4.0, 5.0 amperes per gram (A/g)) recorded in the dark for the fabricated asymmetric light-responsive supercapacitor, according to certain embodiments;

FIG. 9B depicts the obtained specific capacitances from GCD profiles at different current densities (0.5, 1.0, 2.0, 3.0, 4.0, 5.0 A/g) under dark and light conditions for the fabricated asymmetric light-responsive supercapacitor, according to certain embodiments;

FIG. 9C depicts GCD discharging profiles at the different current densities (0.5, 1.0, 2.0, 3.0, 4.0, 5.0 A/g) after charging under the light for the same time, i.e., 300 seconds, for the fabricated asymmetric light-responsive supercapacitor, according to certain embodiments;

FIG. 9D depicts cyclic stability showing capacitance retention and Coulombic efficiency for 12000 GCD cycles under the dark for the fabricated asymmetric light-responsive supercapacitor, according to certain embodiments;

FIG. 10A depicts GCD discharging profiles at current density, i.e., 0.5 A/g, after charging with the light for different times for the fabricated asymmetric light-responsive supercapacitor, according to certain embodiments;

FIG. 10B depicts the obtained specific capacitances from GCD profiles after charging for different times (0, 200, 400, 600, 800, 1000, 1200 sec) for the fabricated asymmetric light-responsive supercapacitor, according to certain embodiments;

FIG. 10C depicts Ragone plots obtained under dark conditions at different current densities, after charging with light for 300 seconds and discharging at different current densities, and after charging with different times and discharging with the same (0.5 A/g) current density for the fabricated asymmetric light-responsive supercapacitor, according to certain embodiments;

FIG. 10D depicts Nyquist plots before cyclic stability (both under dark and light conditions) and after cyclic stability for the fabricated asymmetric light-responsive supercapacitor (the inset represents the equivalent circuit diagram), according to certain embodiments; and FIG. 11 depicts a charge storage mechanism for the developed light-responsive supercapacitor, according to certain embodiments.

DETAILED DESCRIPTION

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The use of the terms "include," "includes," "including," "have," "has," or "having" should be generally understood as open-ended and non-limiting unless specifically stated otherwise.

Aspects of the present disclosure relate to a light-responsive supercapacitor. The light-responsive supercapacitor is developed by employing bismuth vanadate ($BiVO_4$) as the photoactive material, date leaves derived carbon (DLC) as the conductive electrode material, fluorine-doped tin oxide (FTO) as a transparent current collector, and sodium sulphate ($Na_2SO_4$) as the electrolyte. FTO/$BiVO_4$/DLC//DLC/FTO asymmetric light-responsive supercapacitor demonstrates efficient electrochemical behavior. Such an efficient and durable light-responsive supercapacitor can revolutionize the energy storage industry and benefit researchers in renewable energy.

According to an aspect of the present disclosure an asymmetric supercapacitor (otherwise referred to as the supercapacitor) is described. The supercapacitor includes two electrodes. As used herein, the term "electrode" refers to an electrical conductor that contacts a non-metallic part of a circuit, e.g., a semiconductor, an electrolyte, a vacuum, or air. The supercapacitor includes a negative electrode and a positive electrode. The negative electrode and the positive electrode are collectively referred to as 'the electrodes' unless otherwise specifically mentioned.

The negative electrode includes a first fluorine-doped tin oxide (FTO) glass substrate. Optionally, other substrates such as a tin doped indium oxide (ITO) coated glass substrate, an aluminum doped zinc oxide (AZO) coated glass substrate, a niobium doped titanium dioxide (NTO) coated glass substrate, an indium doped cadmium oxide (ICO) coated glass substrate, an indium doped zinc oxide (IZO) coated glass substrate, a fluorine doped zinc oxide (FZO) coated glass substrate, a gallium doped zinc oxide (GZO) coated glass substrate, an antimony doped tin oxide (ATO) coated glass substrate, a phosphorus doped tin oxide (PTO) coated glass substrate, a zinc antimonate coated glass substrate, a zinc oxide coated glass substrate, a ruthenium oxide coated glass substrate, a rhenium oxide coated glass substrate, a silver oxide coated glass substrate, a nickel oxide coated glass substrate, and the like may be used in the negative electrode.

One surface of the first fluorine-doped tin oxide glass substrate is coated with a first composition to form a first coated surface. The first coated surface is coated and/or deposited wholly and/or partially in a uniform and continuous manner. The first composition includes carbon derived from date leaves (referred to as date leaves-derived carbon) and a first polymer. In some embodiments, the carbon may be derived from other parts of date plant such as, root, stem, trunk, bark, palm fronds, flowers, seeds, fruit, the like, and/or a combination thereof. In some embodiments, date leaves may be used in combination with and/or substituted by sweet potato leaves, strawberry leaves, and pandan leaves. In some embodiments, date leaves may be used in combination with and/or substituted by leaves of the *Phoenix* genus. In other embodiments, the dates leaves may be used in combination with and/or substituted by any vegetation known in the art. The date leaves derived carbon is in the form of nanoparticles having an average diameter and/or particle size distribution of 20 to 500 nanometers (nm), preferably 40 to 480 nm, preferably 60 to 460 nm, preferably 80 to 440 nm, preferably 100 to 420 nm, preferably 120 to 400 nm, preferably 140 to 380 nm, preferably 160 to 360 nm, preferably 180 to 340 nm, preferably 200 to 320 nm, preferably 220 to 300 nm, preferably 240 to 280 nm, or preferably about 260 nm. In a preferred embodiment, the first polymer includes polyvinylidene fluoride. In some embodiments the first polymer may include polyvinylidene chloride, polyethylene, polypropylene, polyethylene terephthalate, polyvinyl chloride, polyvinyl fluoride, polyesters, polyamides, and the like. In some embodiments, the polyvinylidene fluoride may be used alone or in combination with any thermoplastic polymer known in the art.

The positive electrode includes a second fluorine-doped tin oxide glass substrate. One surface of the second fluorine-doped tin oxide glass substrate is coated with a bismuth vanadate layer to form a second coated surface. The bismuth vanadate layer is coated and/or deposited on the second fluorine-doped tin oxide glass substrate partially or wholly in a uniform and continuous manner. In an embodiment, the bismuth vanadate layer forms a monolayer on the second fluorine-doped tin oxide glass substrate. The second coated surface is the second fluorine-doped tin oxide glass substrate coated with bismuth vanadate layer. In some embodiments, the bismuth vanadate may also be substituted by a Bi—S—I material, such as $Bi_{13}S_{18}I_2$, $BiSI/Bi_{13}S_{18}I_2$, and the like. In some embodiments, the bismuth vanadate may also be used in combination with a Bi—S—I material, such as $Bi_{13}S_{18}I_2$, $BiSI/Bi_{13}S_{18}I_2$, and the like. In some embodiments, the bismuth vanadate layer includes bismuth vanadate particles. The bismuth vanadate particles are in the form of spheres. In some embodiments, the bismuth vanadate particles may be in the form of three-dimensional oblong spheres, three-dimensional ovals, three-dimensional misshapen spheres, and any other three-dimensional circular shapes known in the art. The bismuth vanadate particles include bismuth vanadate nanoparticles. The bismuth vanadate particles are an agglomeration of the bismuth vanadate nanoparticles. The bismuth vanadate nanoparticles are in the form of nanospheres. In some embodiments, the bismuth vanadate nanoparticles may be in the form of nanorods, oblong nanospheres, three-dimensional ovals, three-dimensional misshapen nanospheres, and any other three-dimensional nanoscale circular shapes known in the art. In some embodiments, the bismuth vanadate particles have an average diameter and/or particle dimension of 0.5 micrometers (μm) to 5 μm, preferably 0.6 to 4.5 μm, preferably 0.7 to 4.0 μm, preferably 0.8 to 3.5 μm, preferably 0.9 to 3.0 μm, preferably 1.0 to 2.5 μm, or preferably 1.5 to 2.0 μm. In some embodiments, the bismuth vanadate nanoparticles have an average diameter and/or particle dimension of 50 to 300 nm, preferably 60 to 260 nm, preferably 80 to 220 nm, preferably 100 to 200 nm, preferably 120 to 180 nm, preferably 140 to 160 nm.

The bismuth vanadate layer is coated with a second composition. The second composition includes date leaves derived carbon and a second polymer. In some embodiments, the first polymer and the second polymer is independently selected from the group including, but are not limited to, poly(vinylidene) fluoride (PVDF), poly(tetrafluoroethylene) (PTFE), poly(acrylonitrile) (PAN), poly(methyl methacrylate) (PMMA), poly(methacrylic acid) (PMAA), poly(acrylic acid) (PAA), poly(vinyl methyl ketone), and poly(ethylene terephthalate) (PET), polysulfone (PSf), poly(ether sulfone) (PSF), polyacrylonitrile (PAN), polyimide (PI), poly(arylene ether nitrile ketone) (PPENK) and the like, which can be used alone or in combination. In a preferred embodiment, the first polymer and the second polymer is a polyvinylidene fluoride.

The asymmetric supercapacitor includes an electrolyte. As used herein, the term "electrolyte" is a substance that forms a solution that can conduct electricity when dissolved in a polar solvent. An electrolyte may also be a medium containing ions that is electrically conducting through the movement of those ions, but not conducting electrons. In an embodiment, the electrolyte is an aqueous electrolyte. In some embodiments, the aqueous electrolyte includes sodium sulfate. In some embodiments, the aqueous electrolyte may include potassium bromide, potassium sulfate, sodium chloride, potassium chloride, and magnesium chloride. The asymmetric supercapacitor includes a separator. In preferred embodiments, the separator is a cellulose membrane saturated with the aqueous electrolyte. The separator may be selected from a group including polypropylene (PP) membrane, glass fiber, cellulose fiber, and the like. In some embodiments, the separator may include bacterial cellulose fiber, a polyolefin such as polyethylene (PE), or a combination of PP and PE. The separator is placed between the positive electrode and the negative electrode, and the electrolyte is present in and on the separator.

FIG. 1A illustrates a schematic flow chart of a method 50 of making the negative electrode. The order in which the method 50 is described is not intended to be construed as a limitation, and any number of the described process steps can be combined in any order to implement the method 50. Additionally, individual steps may be removed or skipped from the method 50 without departing from the spirit and scope of the present disclosure.

At step 52, the method 50 includes rinsing date leaves. In some embodiments, the date leaves can be rinsed with methanol, ethanol, water, distilled water, the like, and/or a combination thereof.

At step 54, the method 50 includes drying the date leaves. The date leaves may be dried, for example, in an oven at 90 to 140° C., preferably 95 to 130° C., preferably 100 to 120° C., preferably about 105 to 110° C., and more preferably about 110° C., to reduce the moisture content to below 5 wt. %, preferably below 4 wt. %, preferably below 3 wt. %, preferably below 2 wt. %, preferably below 1 wt. %, and more preferably less than 0.5 wt. %. The cut date leaves may be dried for any amount of time that provides an adequately dried product, typically, for drying times of 12 to 48 hours, preferably 16 to 36 hours, preferably 20 to 30 hours, and preferably about 24 hours. The drying of the date leaves can be initially done in sun. In some embodiments, the drying can be performed by using heating appliances such as ovens, microwaves, autoclaves, hot plates, heating mantles and tapes, oil baths, salt baths, sand baths, air baths, hot-tube furnaces, hot-air guns, and any other heating appliances known in the art.

At step 56, the method 50 includes cutting the date leaves. The date leaves can be cut manually using simple tools such as knives, scissor, cutters, or any other tool used or know in the art. In some embodiments, the dried date leaves are manually cut into long segments, for example, the dried date leaves are manually cut into 1 to 5 cm, preferably 1.5 to 4 cm, and more preferably 2 to 3 cm long segments.

At step 58, the method 50 includes heating the date leaves in a tube furnace at 800 to 900° C., preferably 810 to 890° C., preferably 820 to 880° C., preferably 830 to 870° C., preferably 840 to 860° C., and more preferably at about 850° C., for 2 to 4 hours, preferably about 3 hours, under a nitrogen atmosphere with a heating rate of 5 to 15° C./minute, preferably 7 to 13° C./minute, and more preferably about 10° C./minute, and a cooling rate of 1 to 10° C./minute, preferably 3 to 7° C./minute, and more preferably about 5° C./minute, to form a pyrolysis date leaf product. In a preferred embodiment, the date leaves are heated in a tube furnace at 800 to 900° C., more preferably about 850° C., for 2 to 4 hours, more preferably about 3 hours, under a nitrogen atmosphere with a heating rate of 10° C./minute and a cooling rate of 5° C./minute to form a pyrolysis date leaf product.

At step 60, the method 50 includes pulverizing the pyrolysis date leaf product. The term "pulverization" refers to the process of pressing or crushing something until it becomes powder or a soft mass. The pyrolysis date leaf product may next be pulverized using any suitable means, for example, by grinding, ball milling, blending, and the like, using manual methods (e.g., mortar and pestle) or machine-assisted methods such as using a mechanical blender, or any other apparatus known to those of ordinary skill in the art. The pyrolysis date leaf product are preferably pulverized until an average particle size of less than 50 μm, preferably less than 40 μm, preferably less than 30 μm, preferably less than 20 μm, preferably less than 10 μm, and preferably less than about 5 μm is achieved.

At step 62, the method 50 includes ball-milling the pulverized pyrolysis date leaf product to form a date leaves derived carbon. The purpose of ball milling the pulverized pyrolysis date leaf product is to reduce the particle size of the pulverized pyrolysis date leaf product. In an embodiment, the ball-milling is carried out at a speed of 2000 to 6000 rpm, preferably 2500 to 5000 rpm, preferably 3000 to 4000 rpm, and more preferably about 3000 rpm, for approximately 2 to 20 hours, preferably for 5 to 18 hours, preferably 10 to 17 hours, preferably 13 to 16 hours, and more preferably for about 15 hours to form milled date leaf particles. Zirconium balls of 400 to 1000 μm in size (diameter), preferably 500 to 900 μm in size, and preferably 600 and 800 μm in size, were used to efficiently grind the pulverized pyrolysis date leaf product. Zirconium balls were used owing to their smooth surface, good sphericity, and high grinding strength. In some embodiments, the zirconium balls may be titanium balls, hafnium balls, and any other composition of balls used in ball mills known in the art. In an embodiment, the weight ratio of the zirconium balls to the pulverized pyrolysis date leaf product is in a range of 1:5 to 1:40, preferably 1:10 to 1:30, and more preferably about 1:20. The date leaves derived carbon was washed with deionized (DI) water and dried at 60 to 100° C., preferably 70 to 90° C., and more preferably about 80° C. for 10 to 14 hours, preferably 11 to 13 hours, and more preferably about 12 hours to obtain ball-milled nano and/or sub-micron carbon.

At step 64, the method 50 includes mixing the date leaves derived carbon with the first polymer in an N-methyl-2- pyrrolidone (NMP) to form a reaction mixture. In some embodiments, an organic solvent may include, but is not limited to, tetrahydrofuran, ethyl acetate, dimethylformamide, acetonitrile, acetone, dimethyl sulfoxide, nitromethane, propylene carbonate, ethanol, formic acid, n-butanol, methanol, the like, or any combination thereof. In some embodiments, the organic solvent may include benzene, cyclohexane, ethanol, methanol, acetone, ethyl acetate, dichloromethane, toluene, and diethyl ether. In some embodiments, a weight ratio of the date leaves derived carbon to the first polymer is 85:15 to 95:5.

At step 66, the method 50 includes drop-casting the reaction mixture onto a first fluorine-doped tin oxide glass substrate and drying to form the negative electrode.

FIG. 1B illustrates a schematic flow chart of a method 70 of making a $BiVO_4$/FTO electrode. The order in which the method 70 is described is not intended to be construed as a limitation, and any number of the described process steps can be combined in any order to implement the method 70. Additionally, individual steps may be removed or skipped from the method 70 without departing from the spirit and scope of the present disclosure.

At step 72, the method 70 includes mixing a hydrated bismuth salt, an acid, and a first base to form a first solution. In some embodiments, the mixing can be done by stirring, swirling, sonicating, or a combination thereof and may be employed to form the resultant mixture. In some embodiments, the acid may be selected from hydrochloric acid, nitric acid, sulfuric acid, hydrobromic acid, hydroiodic acid, perchloric acid, and the like. In some embodiments, the acid is nitric acid. In some embodiments, the first base may be organic or inorganic. The inorganic base may be an alkaline earth metal hydroxide such as beryllium hydroxide ($Be(OH)_2$), magnesium hydroxide ($Mg(OH)_2$), strontium hydroxide ($Sr(OH)_2$), and calcium hydroxide ($Ca(OH)_2$) and/or an alkali metal hydroxide such as lithium hydroxide (LiOH), sodium hydroxide (NaOH), potassium hydroxide (KOH), rubidium hydroxide (RbOH), and cesium hydroxide (CsOH). In an embodiment, the first base is an organic base. The organic base may include pyridine, alkylamines, such as methylamine, imidazole, benzimidazole, histidine, guanidine, phosphazene bases, and the like. In a preferred embodiment, the first base is triethanolamine (TEA). The concentration of TEA in the first solution is in the range of 0.1 to 1 M, preferably 0.1 to 0.5 M, preferably 0.1 to 0.3 M, preferably 0.1 to 0.2 M, and preferably about 0.15 M.

At step 74, the method 70 includes stirring a second base into the first solution to form a second solution. In some embodiments, the second base is KOH. The concentration of the second base is in the range of 0.1 to 5 M, preferably 0.2 to 4 M, preferably 0.5 to 3 M, preferably 0.75 to 1.5 M, and more preferably about 1 M.

At step 76, the method 70 includes heating the second fluorine-doped tin oxide glass substrate in the second solution to form a bismuth film on the second fluorine-doped tin oxide glass substrate. In some embodiments, the second fluorine-doped tin oxide glass substrate can be heated in the second solution in the range of 45° C. to 55° C., preferably 47 to 53° C., and more preferably about 50° C. for a time of 55 to 65 minutes, preferably 58 to 63 minutes, and more preferably about 60 minutes.

At step 78, the method 70 includes rinsing the bismuth film on the second fluorine-doped tin oxide glass substrate. The bismuth film on the second fluorine-doped tin oxide glass substrate may be washed with an aqueous or organic solvent. In a preferred embodiment, the bismuth film is washed with water, preferably DI water.

At step 80, the method 70 includes drying the bismuth film on the second fluorine-doped tin oxide substrate. The bismuth film can be naturally dried at room temperature for 10 to 14 hours, preferably about 12 hours.

At step 82, the method 70 includes dissolving a vanadium compound in dimethyl sulfoxide (DMSO) to form a third solution. The vanadium compound may include chlorides, sulfates, oxides, vanadates, carbides, nitrides, and the like. In a preferred embodiment, the vanadium compound is one or more of vanadium pentoxide ($V_2O_5$), vanadium trioxide ($V_2O_3$), ammonium metavanadate ($NH_4VO_3$), vanadium oxytrichloride ($VOCl_3$), vanadium tetrachloride ($VCl_4$), and most preferably vanadyl acetylacetonate ($C_{10}H_{14}O_5V$). The concentration of the vanadyl acetylacetonate ($C_{10}H_{14}O_5V$) in DMSO is in the range of 0.1 to 0.2 M, preferably 0.14 to 1.6 M, and more preferably about 0.15 M.

At step 84, the method 70 includes drop-casting the third solution on the bismuth film on the second fluorine-doped tin oxide glass substrate.

At step 86, the method 70 includes thermally annealing the vanadium to the bismuth film on the second fluorine-doped tin oxide glass substrate to form a thermally annealed material. In some embodiments, the thermal annealing is done at a temperature of 400 to 500° C., preferably 440 to 460° C., and more preferably about 450° C. for a time of 90 to 150 minutes, preferably 100 to 140 minutes, preferably 110 to 130 minutes, and more preferably about 120 minutes and at a heating ramp of 0.5 to 5° C./min, preferably 1 to 3° C./min, and more preferably about 2° C./min.

At step 88, the method 70 includes soaking the thermally annealed material in a basic solution. The basic solution includes NaOH, preferably at a concentration range of 0.1 to 5 M, preferably 0.2 to 3 M, preferably 0.5 to 2 M, preferably 0.75 to 1 M, and more preferably about 1 M.

At step 90, the method 70 includes rinsing and drying the thermally annealed material to form the $BiVO_4$/FTO electrode. The rinsing can be done with distilled water and can be heated at room temperature.

The $BiVO_4$/FTO electrode is then drop-cast with the reaction mixture of the method 50 comprising the date leaves derived carbon to form a positive electrode of the supercapacitor.

A wearable device may include the supercapacitor. The wearable device may include, but is not limited to, a smart ring, a smartwatch, a smart wristband such as a fitness tracker, augmented reality (AR) headsets, and reality (MR) headsets. The supercapacitor may be electrically connected to a sensor and function as a battery.

In some embodiments, the supercapacitor has a capacitance retention after 12,000 charge-discharge cycles of 85 to 95%, preferably 86 to 94%, preferably 87 to 93%, preferably 88 to 92%, preferably 89 to 91%, and preferably about 90%, of a first charge-discharge. In some embodiments, the supercapacitor has a capacitance retention after 12,000 charge-discharge cycles up to about 95% of a first charge-discharge. In some embodiments, the supercapacitor has a capacitance retention after 12,000 charge-discharge cycles of 85 to 95%, more preferably about 90%, of a first charge-discharge. In some embodiments, the supercapacitor has a specific capacitance of 140 to 160 F/g, preferably 141 to 159 F/g, preferably 142 to 158 F/g, preferably 143 to 157 F/g, preferably 144 to 156 F/g, preferably 145 to 155 F/g, preferably 146 to 154 F/g, preferably 147 to 153 F/g, preferably 148 to 152 F/g, preferably 149 to 151 F/g, and more preferably about 150 F/g at a current density of 0.4 to 0.6 A/g, preferably 0.45 to 0.55 A/g, and more preferably about 0.5 A/g. In some embodiments, the supercapacitor has a specific capacitance up to about 160 F/g at a current density up to about 0.6 A/g. In some embodiments, the supercapacitor has a specific capacitance of 140 to 160 F/g, more specifically 150 F/g, at a current density of 0.4 to 0.6 A/g, more specifically 0.5 A/g. As used herein, the term "current density" refers to the amount of current traveling per unit cross-section area.

In some embodiments, the supercapacitor has an energy density of 22 to 30 Wh/kg, preferably 23 to 29 Wh/kg, preferably 24 to 28 Wh/kg, preferably 25 to 27 Wh/kg, and more preferably about 26 Wh/kg at a power density of about 200 W/kg in the presence of light. In some embodiments, the supercapacitor has an energy density up to about 30 Wh/kg at a power density of 200 W/kg in the presence of light. In some embodiments, the supercapacitor has an energy density of 22 to 30 Wh/kg at a power density of 200 W/kg in the presence of light. In some embodiments, the supercapacitor has an energy density of 10 to 15 Wh/kg, more preferably about 13 Wh/kg, at a power density of about 200 W/kg in the absence of light. As used herein, the "energy density" refers to the total energy in a system per unit volume. As used herein, the "power density" refers to the amount of power per unit volume. In some embodiments, the supercapacitor has a specific capacitance of 220 to 260 F/g, preferably 225 to 255 F/g, preferably 230 to 250 F/g, preferably 235 to 245 F/g, and preferably about 240 F/g at a scan rate of 8 to 12 millivolts per second (mV/sec), preferably about 10 mV/sec under light. In some embodiments, the supercapacitor has a Coulombic efficiency of 80 to 90%, preferably 82 to 88%, preferably 85 to 87%, and more preferably about 86%, after 10,000 to 14,000 charge-discharge cycles, and more preferably about 12,000 charge-discharge cycles at a current density of about 10 A/g. In some embodiments, the supercapacitor has a specific capacitance of 280 to 300 F/g, preferably 285 to 295 F/g, and more preferably about 290 F/g, and discharging time of 450 to 470 seconds, preferably 455 to 465 seconds, and more preferably about 460 seconds after a charging time of 1000 to 1400 seconds, preferably 1100 to 1300 seconds, and more preferably about 1200 seconds with an 8 W light-emitting diode (LED) light bulb at a current density of 0.5 A/g. As used herein, the term "capacitance" refers to the capability of a material object or device to store electric charge. It is measured by the charge in response to a difference in electric potential and expressed as the ratio of those quantities.

EXAMPLES

The following details of the examples describe and demonstrate an asymmetric supercapacitor as described herein. The examples are provided solely for the purpose of illustration and are not to be construed as limitations of the present disclosure, as many variations thereof are possible without departing from the spirit and scope of the present disclosure.

Example 1: Materials

All the materials used in the present disclosure were of analytical grade and used without further purification. Date leaves were gathered from a local palm garden in Saudi Arabia. Bismuth nitrate pentahydrate [$Bi(NO_3)_3 \cdot 5H_2O$], vanadyl acetylacetonate ($C_{10}H_{14}O_5V$), nitric acid ($HNO_3$), sulfuric acid ($H_2SO_4$), hydrochloric acid (HCl), triethanolamine (TEOA), potassium hydroxide (KOH), dimethylsulfoxide (DMSO), sodium hydroxide (NaOH), N-methyl-2-pyrrolidone (NMP), polyvinylidene fluoride (PVDF), acetone, and fluorine-doped tin oxide coated glass (FTO) (7 Ω/sq) were purchased from Sigma-Aldrich. Specialty Gases Company Limited, Jubail, Kingdom of Saudi Arabia, supplied high-purity nitrogen ($N_2$) gas. De-ionized (DI) water was used to prepare the solutions acquired from a Thermo Scientific™ Barnstead™ laboratory water system.

Example 2: Preparation of Date Leaves-Derived Carbon (DLC) Via Pyrolysis and Ball Milling The date leaves-derived carbon (DLC) for the present disclosure was sourced from date leaves harvested from the King Fahd University of Petroleum and Minerals (KFUPM) on-campus date garden. After collection, a comprehensive drying process was undertaken, involving initial sun drying, followed by a through cleanse utilizing DI water and, finally, oven-drying at a temperature of 110° C. for 24 hours to eliminate residual moisture content. The dried date leaves were manually cut into 2 to 3 centimeters (cm) long segments. Pyrolysis was carried out in a tube furnace in an environment of nitrogen gas at a temperature of 850° C. for 3 hours. The heating and cooling rates were maintained at 10° C./minute and 5° C./minute, respectively. The resulting pyrolytic carbon, obtained from the desiccated date leaves, was pulverized using a standard kitchen blender. The resulting powder carbon was then subjected to a high-energy ball-milling technique to synthesize the date leaves carbon. The ball-milling apparatus was operated at a rotational speed of 3000 rpm for 15 hours. Zirconium balls measuring 600 to 800 μm were employed during the ball-milling procedure. Carbon to zirconium balls were used in a mass ratio of about 1:20. The ball-milled carbon was washed with DI water and dried at 80° C. for 12 hours to obtain ball-milled nano/sub-micron carbon. A schematic illustration depicting the DLC preparation process is depicted in FIG. 1C.

Example 3: Preparation of $BiVO_4$ on FTO Via Chemical Bath Deposition

Chemical bath deposition is a well-established method used to mass-produce electrodes. This method was applied to fabricate and direct the growth of $BiVO_4$ nanoparticles in the form of thin films on FTO substrates. The method is mainly divided into two main steps, (i) 3D-hierarchically assembled bismuth oxide ($Bi_2O_3$) growth and deposition and (ii) 3D-hierarchically assembled $BiVO_4$ fabrication. First, 1.5 mL of 0.1 M $Bi(NO_3)_3 \cdot 5H_2O$ solution (dissolved in 1 M $HNO_3$) and 0.5 mL of 1 M TEOA solution were mixed and stirred for 15 minutes at room temperature to obtain a uniform solution. Afterwards, 1 M KOH (2.5 mL) solution was added to the mixture to form a transparent solution. This solution was then transferred into an autoclave containing FTO substrates (working area: 1.0×1.0 cm²), placed vertically, and heated at 50° C. for 60 minutes. The as-grown white layer of $Bi_2O_3$ films was then washed with DI water and naturally dried at room temperature overnight. Secondly, for the 3D-hierarchically assembled $BiVO_4$ fabrication, the process was carried out by adding 30 μL of 0.15 M $C_{10}H_{14}O_5V$, used as vanadium precursor, dissolved in DMSO and drop casting on the top of each $Bi_2O_3$ film. The films were then thermally annealed in a muffle furnace at 450° C. for 120 minutes with a 2° C./minutes heating rate in an ambient environment. The resultant thermally annealed $BiVO_4$ films were immersed in 1 M NaOH solution under gentle stirring to remove the excess of $V_2O_5$, rinsed with DI water, and dried at room temperature. The illustration in FIG. 2 briefly describes the $Bi_2O_3$ preparation on the FTO substrate and its conversion to 3D-hierarchically assembled $BiVO_4$/FTO.

Example 4: Materials Characterization

Using high-resolution field emission scanning electron microscopy (FESEM), the morphology of the electrode materials (DLC and $BiVO_4$/FTO) was examined with a TESCAN-LYRA-3 field emission scanning electron microscope (manufactured by Tescan, Brno, Czech Republic). Using an Oxford Instruments Xmass detector coupled with the FESEM, energy dispersive X-ray spectroscopy (EDS) was conducted. X-ray diffraction (XRD) was utilized to analyze the electrode materials' crystalline structure and phase purity using a Rigaku Miniflex-II diffractometer with Cu—K-Alpha ($\lambda$=0.15416 nm) radiation, operating at a constant voltage of 40 kilovolts (kV) and a constant current of 30 milliamperes (mA) (manufactured by Rigaku, Japan). At ambient temperature, an iHR320 HORIBA Raman spectrometer (manufactured by Horiba, 9701 Dessau Road, Suite 605, Austin, TX 78754, U.S.A) with a charge-coupled device detector and 300 milliwatts (mW) green (532 nm) laser was used to investigate the electrode materials' defective and/or graphite-like structures. The elemental composition of the produced materials was determined using X-ray photoelectron spectroscopy (XPS) with an Al—K-alpha monochromatic X-ray source (Thermo-Scientific, ESCALAB-250Xi XPS-Microprobe, USA).

Example 5: Electrodes and Supercapacitor Device Fabrication

Using the simple drop-casting procedure, the produced DLC was coated on bare FTO, and $BiVO_4$ deposited FTO (FTO/$BiVO_4$) in the first stage. A homogenous slurry was made by uniformly combining 90% (w/w) DLC and 10% (w/w) PVDF (used as a binder) in NMP (as a solvent) and stirring for 180 minutes at 80° C. The homogenous slurry was applied to the bare FTO substrate and the FTO/$BiVO_4$, resulting in thin DLC-coated electrodes. Finally, the light-responsive supercapacitor device was built in the sandwich-type cell assembly with two electrodes. FTO/$BiVO_4$/DLC acted as a positive electrode and DLC/FTO as a negative electrode, while the electrodes were separated by a filter paper soaked in 0.5 molar (M) $Na_2SO_4$ aqueous electrolyte. An ordinary light bulb was used to shine light on the device for the light-responsive properties. FIG. 3 summarizes the fabrication method and practical demonstration of the developed light-responsive supercapacitor device.

Example 6: Photo-Electrochemical Characterization

The photo-electrochemical measurements were carried out in a two-electrode system in 0.5 M $Na_2SO_4$ aqueous electrolyte at room temperature using an electrochemical working station (CHI 760E). Electrochemical impedance spectroscopy (EIS), galvanostatic charge-discharge (GCD), and cyclic voltammetry (CV) techniques were applied for the analysis. Using equations 1 and 2, the specific capacitance ($C_s$) values were measured from the CV and GCD data, respectively. Similarly, equation 3 and equation 4 were used to measure the energy density (E) and power density (P) of the developed light-responsive supercapacitor, respectively.

$$C_s = \frac{1}{m} \times \frac{\int I \times \Delta V}{v \times \Delta V} \quad (1)$$

$$C_s = \frac{1}{m} \times \frac{I \times \Delta t}{\Delta V} \quad (2)$$

$$E = \frac{1}{2} \times C_s \times \Delta V^2 \times \frac{1000}{3600} \quad (3)$$

$$P = \frac{E}{\Delta t} \times 3600 \quad (4)$$

In the above equations (1-4), the $\int I \times \Delta V$ (measured in watts) is the area under the CV curve, v (in V/sec) is the applied scan rate in CV measurements, $\Delta V$ (measured in volts) is the applied operating potential window, m (in grams) is the mass of both electrodes in the light-responsive supercapacitor device, and/(in ampere) is the constant discharging current in GCD measurements.

Results and Discussion

The prepared FTO/$BiVO_4$ and DLC morphologies were characterized through FESEM. FIGS. 4A-4G show the FESEM images of the as-grown $BiVO_4$ films on FTO. FIGS. 4A-4D show that the $BiVO_4$ nanoparticles are uniformly distributed in the FTO surface in flower-like shapes. The high magnification FESEM images (FIG. 4E and FIG. 4F) reveal that the $BiVO_4$ film consisted of nanoparticles grown on the FTO substrate and exhibited an average diameter of ~100 nm. In FIG. 4G, the EDS examination verifies the existence of the parent elements Bi, V, and O originating from the $BiVO_4$ film. These elements are clearly identifiable within the FTO/$BiVO_4$ photo-electrode.

The morphological examination of the DLC was carried out by recording FESEM micrographs. As shown in FIGS. 5A-5F, the DLC exhibited nano/submicron particle type morphology with a scaly and rough surface. The ball-milling method was used to make the carbon particles, so their sizes were thought to range from 50 nm to 200 nm. The prepared nanostructured materials provide high exposure to active sites for easy access to electrolytes and fast electron transport when serving as supercapacitor electrodes. EDS analysis was recorded to investigate the DLC chemical compositions, and the results are shown in FIG. 5G. According to the EDS analysis, C, O, Si, Mg, and K are commonly present due to their existence in the palm tree leaves composition. The presence of Zr may be traced to the zirconia balls used in the ball-milling process for the DLC preparation.

The XRD spectra of FTO/$BiVO_4$ and bare FTO are shown in FIG. 6A. For $BiVO_4$, the diffraction patterns at 2θ=19.1°, 29.3°, 31.1°, 35.3°, 40.4°, 46.4°, 47.8°, 50.8°, 54.2°, and 59.7° correspond to (1 0 1), (1 1 2), (0 0 4), (2 0 0), (1 2 1), (2 1 3), (2 0 4), (2 2 0), (1 1 6), and (1 1 2) diffraction planes of tetragonal phase of $BiVO_4$ (JCPD card no. 01-078-1535), respectively. The peaks marked with the flower (·) symbol in the XRD spectrum of FTO/$BiVO_4$ correspond to FTO. Similarly, the prepared DLC was also investigated via XRD with the results shown in FIG. 6B. The XRD spectrum of DLC displays the existence of carbon in addition to $ZrO_2$ and $SiO_2$. The DLC diffraction peaks at 2θ=24.5° and 44.5° correspond to the (0 0 2) and (1 0 1) diffraction plans of graphitic carbon, respectively, while the existence of $SiO_2$ diffraction peaks in the DLC is due to silica, which is thought to be due to the biomass carbon source and/or the glass slide of the electrode. The $ZrO_2$ diffraction peaks in the DLC are thought to be due to the zirconia traces left after ball-milling in the DLC composition. Raman spectroscopy of the 3D-hierarchical BiVO$_4$ and DLC were analyzed to understand the internal phase of the materials. FIG. 6C shows the Raman spectrum of FTO/BiVO$_4$, which supports the production of BiVO$_4$ films. The peak at 824 inverse centimeters (cm$^{-1}$) belongs to the antisymmetric stretching modes of the VO$_4$ tetrahedra, while the shoulder peak at 704 cm$^{-1}$ corresponds to the symmetric stretching modes of the same (VO$_4$ tetrahedra). The bending modes of the VO$_4$ tetrahedra cause peaks at 362 cm$^{-1}$ and 320 cm$^{-1}$, and the crystal lattice vibration causes peaks at 203 cm$^{-1}$ and 120 cm$^{-1}$ (external modes). The Raman spectrum of DLC is shown in FIG. 6D, where two prominent peaks are easily visible at around 1350 cm$^{-1}$ and 1590 cm$^{-1}$, ascribed to the D and G bands, respectively. A disordered carbon structure or an irregularity in the lattice space is indicated by the D band's relative intensity ratio compared to the G band, which was computed to be 1.7, indicating a considerable amorphous form of the DLC.

XPS confirmed the chemical oxidation states and purity of the produced BiVO$_4$/FTO photo-electrode. The XPS survey spectrum (FIG. 7A) demonstrate the existence of components linked to Bi, V, O, Sn, and F, which are from the BiVO$_4$ materials and the FTO substrate. FIG. 7B shows the high-resolution deconvoluted spectrum of Bi 4f, which includes two prominent peaks at binding energies centered at around 163.9 and 158.5 eV, corresponding to the Bi 4f$_{5/2}$ and Bi 4f$_{7/2}$, respectively [T. Palaniselvan, L. Shi, G. Mettela, D. H. Anjum, R. Li, K. P. Katuri, P. E. Saikaly, P. Wang, Vastly Enhanced BiVO$_4$ Photocatalytic OER Performance by NiCoO2 as Cocatalyst, *Adv. Mater. Interfaces*, 4 (19) (2017) 1700540, which is incorporated herein by reference in its entirety]. The Bi 4f core-level area is well separated by spin-orbit components (5.4 eV), verifying the Bi element's +3 oxidation state. The V 2p high-resolution deconvoluted spectrum in FIG. 7C clearly shows two prominent peaks associated with the V 2p$_{1/2}$ and V 2p$_{3/2}$ with binding energies of 523.1 eV and 515.4 eV, respectively. V 2p has a spin-orbit binding energy difference of 7.7 eV, indicating that it is in the +5 state [T. Palaniselvam, L. Shi, G. Mettela, D. H. Anjum, R. Li, K. P. Katuri, P. E. Saikaly, P. Wang, Vastly Enhanced BiVO$_4$ Photocatalytic OER Performance by NiCoO2 as Cocatalyst, *Adv. Mater. Interfaces*, 4 (19) (2017) 1700540, incorporated by reference in its entirety]. The XPS high-resolution deconvoluted spectrum of O 1s in FIG. 7D displays two prominent peaks with binding energies of 529.6 eV and 528.5 eV, ascribed to the BiVO$_4$ lattice oxygen and surface hydroxyl groups, respectively [J. Li, H. Yuan, J. Li, W. Zhang, Y. Liu, N. Liu, H. Cao, Z. Jiao, The significant role of the chemically bonded interfaces in BiVO$_4$/ZnO heterostructures for photoelectrochemical water splitting, *Appl. Catal. B. Envir.* 285 (2021) 119833; Y. Chen, Y. Liu, X. Xie, C. Li, Y. Si, M. Zhang, Q. Yan, Synthesis flower-like BiVO$_4$/BiOI core/shell heterostructure photocatalyst for tetracycline degradation under visible-light irradiation, *J. Mater. Sci.—Mater. Electron.* 30 (10) (2019) 9311-9321; and S. S. M. Bhat, S. A. Lee, T. H. Lee, C. Kim, J. Park, T. W. Lee, S. Y. Kim, H. W. Jang, All-Solution-Processed BiVO4/TiO2 Photoanode with NiCo2O4 Nanofiber Cocatalyst for Enhanced Solar Water Oxidation, *ACS Appl. Energy Mater.* 3 (6) (2020) 5646-5656, each of which are incorporated herein by reference in their entireties]. The results of XPS confirm that the developed BiVO$_4$/FTO photo-electrode was made entirely of BiVO$_4$ with no extra impurities.

The photo-electrochemical performances of the fabricated asymmetric supercapacitor composed of FTO/BiVO$_4$/DLC and DLC/FTO electrodes were evaluated using cyclic voltammetry (CV), galvanostatic charge discharge (GCD), Electrochemical Impedance Spectroscopy (EIS) techniques. FIG. 8A shows the CV curves of the asymmetric supercapacitor at different scan rates under the dark. All the CV curves exhibited a quasi-rectangular shape even at a high scan rate of 100 mV/sec, indicating the good capacitive behavior of the developed electrode materials. Additionally, no redox peaks were observed on the CV curves, indicating that the active materials' charge/discharge process was carried out at a pseudo-constant rate over the complete voltammetric cycle in the whole operating potential window (OPW). Since the redox reactions depend on the absorption-desorption of electrolyte ions at low scan rates (i.e., 10 mV/sec), the diffusion of ions from the electrolyte can gain access to almost all available pores of the electrode, leading to a complete adsorption reaction. Therefore, it shows almost ideal capacitive behavior. However, as the scan rate increases, the effective interaction between the ions and the electrode decreases, and the deviation from the rectangularity of the CV becomes obvious. As shown in the CV curves, as the scan rate increases from 10 to 100 m V/see, the current density and the area under the CV curves increase, which is typical behavior of supercapacitors. The specific capacitances from the CV curves were calculated using equation 1, and the results are summarized in FIG. 8B. The specific capacitance of the asymmetric supercapacitor was calculated to be about 120 F/g at a scan rate of 10 mV/sec and decreased with the increase in scan rates. Even at a high scan rate of 100 mV/sec, the specific capacitance was about 40 F/g. The CV curves were also recorded under light to test the light-response/photo-charge ability of the fabricated asymmetric supercapacitor.

As shown in FIG. 8C, the area under CV and current density of the asymmetric supercapacitor tested under dark conditions is comparatively smaller than the same asymmetric supercapacitor tested under light with similar experimental conditions, indicating a relatively low capacitance. However, the area under the CV curve and current density of the asymmetric supercapacitor tested under light is larger, which is ascribed to the light-responsive behavior of the photoactive BiVO$_4$ material. The photoactive BiVO$_4$ network structure can create improved charge generation and thus increase the specific capacitance. The CV curves of the fabricated asymmetric supercapacitor were further recorded under light at different scan rates from 10 to 100 mV/sec. This shows a typical supercapacitor behavior, i.e., the area under CV curves and current density increases with the increase in scan rates. The specific capacitances from the CV curves were calculated using equation 1, and the results are summarized in FIG. 8D. The specific capacitance of the asymmetric supercapacitor was calculated to be about 240 F/g at a scan rate of 10 mV/sec and decreases with the increase in scan rates. Even at a high scan rate of 100 mV/sec, the specific capacitance was about 40 F/g.

The GCD analysis was carried out in the dark at different current densities from 0.5 to 5 A/g to examine the electrochemical performance of the fabricated asymmetric light-responsive supercapacitor. As shown in FIG. 9A, all GCD profiles show a nearly triangular shape with a little deviation, corresponding to the signature of a redox-type storage mechanism with good electrochemical reversibility. The developed asymmetric light-responsive supercapacitor also demonstrated a negligible IR drop (potential drop due to solution resistance) at low current density (i.e., 0.5 A/g), showing the high conductive nature of electrodes, which could be attributed to the DLC conductive on both positive and negative electrodes. The specific capacitances from the GCD profiles were calculated using equation 2, and the results are summarized in FIG. 9B. The specific capacitance of the asymmetric supercapacitor was calculated to be about 150 F/g at a current density of 0.5 A/g and decreased with the increase in current densities. Even at a high current density of 5 A/g, the specific capacitance was about 60 F/g.

The GCD profiles were also recorded under light to test the light-response/photo-charge ability of the fabricated asymmetric light-responsive supercapacitor. At this stage, the supercapacitor was charged with the normal lab light for 300 seconds and then galvano-statically discharged at different current densities. As shown in FIG. 9C, the fabricated asymmetric light-responsive supercapacitor could generate a potential of around 0.6 V after charging for 300 seconds. Similarly, the charged supercapacitor (for 300 seconds of light illumination) was discharged at different current densities (from 5 to 0.5 A/g). It was demonstrated that decreasing the discharging current density from 5 to 0.5 A/g increases the discharging time of the asymmetric light-responsive supercapacitor, which is typical behavior of a good supercapacitor. The supercapacitor discharging time was increased to around 300 seconds when discharged with a current density of 0.5 A/g. This shows an excellent charge storage performance of the developed light-responsive supercapacitor. Equation 2 was used to calculate the specific capacitance of the light-responsive supercapacitor after being charged with light for 300 seconds. As shown in FIG. 9B, the specific capacitance of the developed supercapacitor reaches a maximum of ~180 F/g at a current density of 0.5 A/g. However, it still maintained a high specific capacitance of ~90 F/g at a high current density of 5 A/g. These results demonstrate that the photoactive $BiVO_4$ network structure could improve charge generation and, thus, increase the specific capacitance. The higher specific capacitance observed during photo-charging, even without an external electric source, can be attributed to the additional charge carriers generated by the photoactive $BiVO_4$ material during exposure to light. When $BiVO_4$ absorbs photons from light, it excites electrons from the valence band to the conduction band, creating electron-hole pairs. These photo-generated charge carriers are available for storage in the supercapacitor, similar to the charge carriers supplied by a potentiostat during electrical charging. Light illumination is an alternative energy source that induces a photovoltaic effect in $BiVO_4$, creating extra charge carriers. These additional charge carriers effectively increase the amount of stored charge in the supercapacitor during photo-charging, leading to a higher specific capacitance. This photo-induced charge generation mechanism is an additional process to the standard charge storage mechanisms (double-layer capacitance and pseudocapacitance) that occur when a supercapacitor is electrically charged. When photo-charging is employed, more charge carriers are available for storage, resulting in a higher specific capacitance than conventional electrical charging. Electrochemical stability, i.e., specific capacitance retention and Coulombic efficiency is helpful for understanding supercapacitors' long-term stability and electrochemical efficiency. The electrochemical stability of the developed asymmetric light-responsive supercapacitor was tested by GCD analysis with 12,000 GCD cycles at a current density of 10 A/g under dark conditions. As shown in FIG. 9D, the asymmetric light-responsive supercapacitor, exhibited excellent electrochemical stability by maintaining ~90% of its initial specific capacitance and ~86% of the Coulombic efficiency after 12,000 GCD cycles.

Photo-charging time is a parameter for measuring light-responsive supercapacitors. The electrochemical performance of the developed light-responsive supercapacitor by different charging times with light and discharging with the same current density was tested. FIG. 10A shows the GCD profiles of the light-responsive supercapacitors after charging with different light illumination times and discharging with the same current density (i.e., 0.5 A/g). The discharging time increases from 136 seconds to 460 seconds with the increasing charging time from 60 seconds to 1200 seconds. The voltage produced due to photo-charging also increases with the increase in light-illumination time. This demonstrates the excellent photo-charge generation property of the photoactive $BiVO_4$ material. Equation 2 was used to calculate the specific capacitance of the light-responsive supercapacitor after being charged with light at different times and discharged at a current density of 0.5 A/g. As shown in FIG. 10B, the specific capacitance of the developed supercapacitor reaches a maximum of ~290 F/g at a discharging current density of 0.5 A/g after charging with light for 1200 seconds. The developed supercapacitor maintains a high specific capacitance of ~85 F/g at a lower charging time of 60 seconds and discharging at a current density of 0.5 A/g. The increase in specific capacitance with increasing photo-charging time can be attributed to the accumulation of photo-generated charge carriers in the supercapacitor device over time. The $BiVO_4$ material in the positive electrode is a visible-light responsive semiconductor. When illuminated with light, it generates electron-hole pairs due to the absorption of photons. These photo-generated charge carriers contribute to the charge stored in the supercapacitor. When the photo-charging time increases, more photons are absorbed by the $BiVO_4$ layer, generating more electron-hole pairs. Consequently, more charge carriers become available for storage in the supercapacitor, increasing the specific capacitance. This effect will continue until the supercapacitor reaches its maximum charge storage capacity, and further photo-charging will not result in an additional specific capacitance increase. The relationship between photo-charging time and specific capacitance is not always linear, as there may be other factors affecting the charge storage process, such as charge recombination, a saturation of photo-generated charge carriers, and limitations in the charge transfer efficiency at the electrode-electrolyte interface; however, increasing the photo-charging time will generally lead to a higher specific capacitance if the supercapacitor is not fully charged.

Energy density is a factor used in comparing various energy storage system types. In general, a high energy density in supercapacitors is preferred for portable microelectronics due to the ability to provide a power supply for extended periods. The rate of energy transfer during the charging or discharging processes has an impact on power density as well. FIG. 10C investigates a Ragone plot between the light-responsive supercapacitor's energy and power density. The Ragone plots were obtained under dark conditions at different current densities, after charging with light for 300 seconds and discharging at different current densities, and after charging at different times and discharging with the same (0.5 A/g) current density. The energy density value typically decreases as the power density increases. It is demonstrated that the energy density of the light-responsive supercapacitor is higher under light conditions as compared to dark conditions at the same power density. The light-responsive supercapacitor exhibited a high energy density of around 13 Wh/kg at a power density of 200 W/kg under the dark, whereas the energy density increased to 16 Wh/kg for the same power density of 200 W/kg under the light. At the same power density of 200 W/kg (i.e., discharging current density of 0.5 A/g), the energy density increases from 8 Wh/kg to 26 Wh/kg upon increasing the charging time under light from 60 seconds to 1200 seconds. Due to its high specific capacitance and extended working voltage under light, the light-responsive supercapacitor exhibits good energy density. Furthermore, the energy density obtained is greater than reported values for light-responsive supercapacitors, as shown in Table 1.

EIS characterization results in a particular frequency signature known as the Warburg impedance due to the migration and diffusion of reactants towards or away from the electrode surface. The fundamental electrochemical phenomena can be seen in the frequency character dependent on impedance. EIS tests were performed in the frequency range from 1 hertz (Hz) to 1 megahertz (MHz) to better examine the capacitive property and electrode conductivity of the light-responsive supercapacitor. The EIS Nyquist plots for the light-responsive supercapacitors before cyclic stability (both under dark and light conditions) and after cyclic stability are compared in FIG. 10D. Each of the Nyquist spectra began with a typical semicircle and ended with a straight line. The spectra's high-frequency portion contains parametric information about the electrode resistance. The solution resistance ($R_S$) could be represented from the intersection to the Nyquist plot with the horizontal axis at the starting point. The diameter of the semicircle in the spectrum represents the resistance resulting from charge transfer resistance ($R_{CT}$) kinetics at the electrode/electrolyte interface and electrode geometry. The parallel combination of double-layer capacitance ($C_{DL}$) and $R_{CT}$ is responsible for the semicircle in the Nyquist plot. The electrode capacitive response is represented by a straight line drawn from the frequency knee point (real axis, Z'). A straight line would ideally parallel the imaginary axis (−Z''). The low-frequency line slope measures the diffusion resistance known as the Warburg impedance ($Z_W$). Such a combination of $R_S$, $R_{CT}$, $C_{DL}$, and $Z_W$ could be represented by an equivalent circuit diagram, as shown in the inset of FIG. 10D. The Nyquist plots displayed a semicircle in the high-frequency zone and a straight line in the low-frequency region. The similar shape of the Nyquist plots before and after stability under dark conditions show the stable behavior of the light-responsive supercapacitor, even after charging and discharging for 12,000 cycles. Under light conditions, the Nyquist plot of the light-responsive supercapacitor shows a different behavior with a lower charge transfer resistance (smaller diameter of the semicircle at a high-frequency range) and an excellent slope of the straight line at a low-frequency range. This may be due to more charge generated upon shining the light from $BiVO_4$ material, which caused the charge transfer resistance to decrease.

The developed light-responsive supercapacitor operates as both a photocell and a supercapacitor. The $BiVO_4$ in the device acts as a light absorber, generating electron-hole pairs upon light illumination, which is then exploited for energy storage in the supercapacitor setup. As shown in FIG. 11, when light shines on the $BiVO_4$ layer, photons with energy equal to or higher than the bandgap of $BiVO_4$ can be absorbed. $BiVO_4$ is an n-type semiconductor whose majority charge carriers are the electrons. Upon light irradiation, the photo-generated electrons are excited from the valence band to the conduction band of $BiVO_4$, leaving behind holes in the valence band and allowing charge separation. The photo-generated electrons are transferred to the DLC layer due to the internal electric field generated within the $BiVO_4$ upon photoexcitation. The positive electrode (FTO/$BiVO_4$/DLC) now has a surplus of electrons, while the negative electrode (DLC/FTO) is relatively electron deficient. A potential difference between the two electrodes is created. The potential difference allows the supercapacitor to store energy. The $Na_2SO_4$ aqueous electrolyte plays a role during the charging of the supercapacitor. It primarily allows for the movement of ions to maintain charge neutrality in the device. The electrolyte provides the medium for ion transportation between the two electrodes during the charging process.

As the photo-generated electrons accumulate on the positive electrode (FTO/$BiVO_4$/DLC), the electrolyte allows the movement of positive sodium ions ($Na^+$) toward the positive electrode to neutralize the negative charge from the photo-generated electrons. Similarly, negatively charged sulfate ions ($SO_4^{2-}$) move towards the negative electrode (DLC/FTO) to neutralize the positive charge that builds up due to electron depletion. The movement of ions toward the electrodes leads to the formation of an electrical double layer (EDL) at the interface between the electrode and the electrolyte. This EDL is a mechanism of energy storage in supercapacitors. During the charging process, the ions in the electrolyte are attracted to the oppositely charged electrodes, forming layers of accumulated charges. The EDL behaves much like a traditional capacitor, where the separation of charge stores energy, and is a reason supercapacitors have such high energy storage capacity. The electrolyte allows for rapid and reversible adsorption and desorption of ions at the electrode/electrolyte interface. This feature contributes to supercapacitors' high-power density and excellent cycling stability. Supercapacitors can be charged and discharged much faster than traditional batteries because the electrolyte can quickly deliver and remove ions to the electrode surfaces during charge and discharge cycles. Therefore, the $Na_2SO_4$ aqueous electrolyte plays a role in the charging of the supercapacitor, enabling efficient energy storage and fast charge/discharge cycles.

When the supercapacitor is connected to an external circuit, the accumulated electrons flow from the positive electrode to the negative electrode, discharging the stored energy to power the external circuit. During this discharging phase, the $Na_2SO_4$ aqueous electrolyte allows for the movement of ions to maintain charge neutrality in the device. As electrons move through the external circuit from the positive electrode to the negative electrode, the negatively charged sulfate ions ($SO_4^{2-}$) in the electrolyte move towards the positive electrode to compensate for the loss of negative charge (electron). Simultaneously, the positive sodium ions ($Na^+$) move toward the negative electrode to neutralize the excess negative charge. The cycle can be repeated by illuminating the device with light again, which causes more electron-hole pairs to be created, recharging the device. Overall, the system represents a sustainable energy storage solution that uses light as a renewable energy source. It combines the benefits of photocells (which convert light energy into electrical energy) and supercapacitors (which store energy and have the potential to release energy quickly).

TABLE 1

Comparison of various parameters of the fabricated light-responsive supercapacitor with reported similar light-responsive supercapacitors

| Positive Electrode Material | Negative Electrode Material | Electrolyte | Light Source | Specific Capacitance, Current Density | Energy Density | Power Density (W/kg) | Capacitance Retention (%, Cycle No.) | Reference |
|---|---|---|---|---|---|---|---|---|
| FTO/BiVO$_4$/DLC | DLC/FTO | 0.5M Na$_2$SO$_4$ | 8 W LED light bulb | 290 F/g, 0.5 A/g | 26 Wh/kg | 200 | 90, 12000 | Present disclosure |
| ZnO/FTO | ZnO/PET | PVA/LiCl | UV light radiation | 40 mF/g, 1.1 mA/g | 78 × 10$^{-3}$ Wh/kg | 4 | 80, 3000 | 1 |
| BiVO$_4$-RGO | RGO | 1M Na$_2$SO$_4$ | 8 W blue LED light | 142 F/g, 0.2 A/g | — | — | 78, 53 | 2 |
| TiO$_2$/CNTs | — | 6M KOH | UV light irradiation | 7 F/g, 0.2 A/g | — | — | 97, 100 | 3 |
| PANI@ITO | PANI/CNTs | PVA/H$_2$SO$_4$ | Solar simulator | 140 F/g, 1 A/g | — | — | — | 4 |
| PEDOT:PSS | CNTs | PVA/H$_3$PO$_4$ | Solar simulator | 80 F/g, — | 3 Wh/kg | 150 | — | 5 |
| ZnO/Ag$_2$S/ZnS/PEDOT | PEDOT | PVP/[HEMIm][BF4] | Solar simulator | 0.7 mF/cm$^2$, 50 mV/sec | — | — | —, 1200 | 6 |
| MoS$_2$@carbon | MoS$_2$@carbon | H$_2$SO$_4$-PVA | 365 nm UV light | 37 F/g, 1 A/g | 75 Wh/kg | 900 | 90, 10000 | 7 |

1 refers to C. T. Altaf, O. Coskun, A. Kumtepe, A. M. Rostas, I. Iatsunskyi, E. Coy, E. Erdem, M. Sankir, N. D. Sankir, Photo-supercapacitors based on nanoscaled ZnO, *Sci. Rep.* 12 (1) (2022) 1148; 2 refers to A. Roy, P. Majumdar, P. Sengupta, S. Kundu, S. Shinde, A. Jha, K. Pramanik, H. Saha, A photoelectrochemical supercapacitor based on a single BiVo4-RGO bilayer photocapacitive electrode, *Electrochim. Acta* 329 (2020) 135170; 3 refers to B. Zhang, R. Shi, Y. Zhang, C. Pan, CNTs/TiO2 composites and its electrochemical properties after UV light irradiation, *Prog. Nat. Sci. Mat. Int.* 23 (2) (2013) 164-169; 4 refers to Y. Yin, K. Feng, C. Liu, S. Fan, A polymer Supercapacitor Capable of Self-Charging under Light Illumination, *J. Phys. Chem. C.* 119 (16) (2015) 8488-8491; 5 refers to G. Wee, T. Salim, Y. M. Lam, S. G. Mhaisalkar, M. Sirnivasan, Printable photo-supercapacitor using single walled cabon nanotubes, *Energy Environ. Sci.* 4 (2) (2011) 413-416; 6 refers to D. Solís-Cortés, E. Navarrete-Astorga, R. Schrebler, J. J. Peinado-Pérez, F. Martin, J. R. Ramos-Barrado, E. A. Dalchiele, A solid-state integrated photo-supercapacitor based on ZnO nanorod arrays decorated with Ag2S quantum dots as the photoanode and a PEDOT charge storage counter-electrode, *RSC Adv.* 10 (10) (202) 5712-5721; 7 refers to Z. Tang, J. Dai, W. Wei, Z. Gao, Z. Liang, C. Wu, B. Zeng, Y. Zu, G. Chen, W. Luo, C. Yuan, L. Dai, In Situ Generation of Ultrathin MoS2 Nanosheets in Carbon Matrix for High Energy Density Photo-Responsive Supercapacitors, *Adv. Sci.* 9 (24) (2022) 2201685, each of which are incorporated herein by reference in their entireties.

In the present disclosure, BiVO$_4$ as a photoactive material, DLC as a conductive material, FTO as a transparent substrate, and 0.5 M Na$_2$SO$_4$ as an electrolyte are used to develop a light-responsive supercapacitor. BiVO$_4$ is used as a light absorber due to its appropriate bandgap, high stability, and environmental benignity. Upon light illumination, BiVO$_4$ facilitates the creation of electron-hole pairs and charge separation for photo-charging. DLC, recognized for its excellent electrical conductivity and chemical stability, serves as the electrode material, while Na$_2$SO$_4$ aqueous electrolyte aids in ion transportation and formation of the electrical double layer, for energy storage in supercapacitors.

Herein, the photoconductive electrode (FTO/BiVO$_4$) is prepared using a chemical bath deposition approach, whereas the DLC is prepared by pyrolyzing the powdered date leaves and ball-milling. FTO/BiVO$_4$/DLC is the positive electrode in constructing an asymmetric light-responsive supercapacitor and DLC/FTO is the negative electrode. With a specific capacitance of 150 F/g at a current density of 0.5 A/g, the FTO/BiVO$_4$/DLC//DLC/FTO asymmetric light-responsive supercapacitor indicated excellent electrochemical behavior, demonstrating the electrodes' simple charge transfer capacity during electrical charging and discharging operations. The asymmetric light-responsive supercapacitor is photo-charged with light for 1200 seconds and yields a maximum specific capacitance of 290 F/g at a discharging current density of 0.5 A/g. At a power density of 200 W/kg under dark conditions, the light-responsive supercapacitor shows a high energy density of about 13 Wh/kg. When the charging period is raised to 1200 seconds under light, the energy density rises to 26 Wh/kg. The asymmetric light-responsive supercapacitor demonstrates an electrochemical stability by retaining around 90% of its initial specific capacitance and about 86% of the Coulombic efficiency throughout 12,000 GCD cycles. The light-responsive supercapacitor's photosensitive function operates without the need for an external bias voltage from a bulky power source, thus facilitating the integration of this device into portable instruments. The light-responsive supercapacitor can also store photo-generated voltage signals, which is beneficial for the timely recording of surrounding information.

Numerous modifications and variations of the present disclosure are possible in light of the above teachings. It is therefore to be understood that within the scope of the appended claims, the disclosure may be practiced otherwise than as specifically described herein.

The invention claimed is:

1. An asymmetric supercapacitor, comprising:
   a negative electrode comprising a first fluorine-doped tin oxide glass substrate, wherein the first fluorine-doped tin oxide glass substrate has a first coated surface, wherein the first coated surface is a first composition comprising a date leaves derived carbon and a first polymer;

a positive electrode comprising a second fluorine-doped tin oxide glass substrate, wherein the second fluorine-doped tin oxide glass substrate has a second coated surface, wherein the second coated surface is a bismuth vanadate layer, wherein the bismuth vanadate layer is coated with a second composition comprising the date leaves derived carbon and a second polymer;

an aqueous electrolyte; and a separator, wherein the separator is between the positive electrode and the negative electrode, and the electrolyte is present in and on the separator.

2. The supercapacitor of claim 1, wherein the date leaves derived carbon is in the form of nanoparticles having an average diameter of 20 to 500 nanometers (nm).

3. The supercapacitor of claim 1, wherein the bismuth vanadate layer comprises bismuth vanadate particles comprised of bismuth vanadate nanoparticles.

4. The supercapacitor of claim 3, wherein the bismuth vanadate particles have an average diameter of 0.5 to 5 micrometers (µm).

5. The supercapacitor of claim 3, wherein the bismuth vanadate nanoparticles have an average diameter of 50 to 300 nm.

6. The supercapacitor of claim 1, wherein the negative electrode is made by a process comprising:

rinsing date leaves;

drying the date leaves;

cutting the date leaves;

heating the date leaves in a tube furnace at 800 to 900° C. for 2 to 4 hours under a nitrogen atmosphere with a heating rate of 10° C./minute and a cooling rate of 5° C./minute to form a pyrolysis date leaf product;

pulverizing the pyrolysis date leaf product;

ball-milling the pulverized pyrolysis date leaf product to form the date leaves derived carbon;

mixing the date leaves derived carbon with the first polymer in an N-methyl-2-pyrrolidone to form a reaction mixture;

drop-casting the reaction mixture onto the first fluorine-doped tin oxide glass substrate and drying to form the negative electrode.

7. The process of claim 6, wherein a weight ratio of the date leaf date leaves derived carbon to the first polymer is 85:15 to 95:5 percent by weight.

8. The process of claim 6, wherein the ball-milling occurs at a rate of 3000 rpm for 15 hours with zirconium balls having a diameter from 600 to 800 µm and a ratio of the pulverized pyrolysis date leaf product to the zirconium balls of 1:20 by weight.

9. The supercapacitor of claim 1, wherein the positive electrode is made by a process comprising:

mixing a hydrated bismuth salt, an acid, and a first base to form a first solution;

stirring a second base into the first solution to form a second solution;

heating the second fluorine-doped tin oxide glass substrate in the second solution to form a bismuth film on the second fluorine-doped tin oxide glass substrate;

rinsing the bismuth film on the second fluorine-doped tin oxide glass substrate;

drying the bismuth film on the second fluorine-doped tin oxide substrate;

dissolving a vanadium compound in dimethyl sulfoxide to form a third solution;

drop-casting the third solution on the bismuth film on the second fluorine-doped tin oxide glass substrate;

thermally annealing the vanadium to the bismuth film on the second fluorine-doped tin oxide glass substrate to form a thermally annealed material;

soaking the thermally annealed material in a basic solution;

rinsing and drying the thermally annealed material;

mixing the date leaves derived carbon with the second polymer in an N-methyl-2-pyrrolidone to form a fourth solution; and drop-casting the fourth solution onto the thermally annealed material and drying to form the positive electrode.

10. The process of claim 9, wherein the thermal annealing is done at a temperature of 400 to 500° C., for a time of 90 to 150 minutes, and at a heating ramp of 0.5 to 5° C./min.

11. The supercapacitor of claim 1, wherein the first polymer is a polyvinylidene fluoride.

12. The supercapacitor of claim 1, wherein the aqueous electrolyte comprises sodium sulfate.

13. The supercapacitor of claim 1, wherein the separator is a cellulose membrane saturated with the aqueous electrolyte.

14. The supercapacitor of claim 1, wherein the supercapacitor has a capacitance retention after 12,000 charge-discharge cycles of 85 to 95% of a first charge-discharge.

15. The supercapacitor of claim 1, wherein the supercapacitor has a specific capacitance of 140 to 160 faradays per gram (F/g) at a current density of 0.4 to 0.6 amperes per gram (A/g).

16. The supercapacitor of claim 1, wherein the supercapacitor has an energy density of 22 to 30 watt-hours per kilogram (Wh/kg) at a power density of 200 watts per kilogram (W/kg) in the presence of light.

17. The supercapacitor of claim 1, wherein the supercapacitor has an energy density of 10 to 15 Wh/kg at a power density of 200 W/kg in the absence of light.

18. The supercapacitor of claim 1, wherein the supercapacitor has a specific capacitance of 220 to 260 F/g at a scan rate of 10 millivolts per second (mV/sec) under light.

19. The supercapacitor of claim 1, wherein the supercapacitor has a Coulombic efficiency of 80 to 90% after 12,000 charge-discharge cycles at a current density of 10 A/g.

20. The supercapacitor of claim 1, wherein the supercapacitor has a specific capacitance of 280 to 300 F/g and discharging time of 450 to 470 seconds after a charging time of 1000 to 1400 seconds with an 8 W light-emitting diode (LED) light bulb at a current density of 0.5 A/g.

* * * * *